United States Patent
Nozoe et al.

(10) Patent No.: US 11,914,248 B2
(45) Date of Patent: *Feb. 27, 2024

(54) PHOTO-ALIGNMENT COPOLYMER, PHOTO-ALIGNMENT FILM, AND OPTICAL LAMINATE

(71) Applicant: FUJIFILM Corporation, Tokyo (JP)

(72) Inventors: Yutaka Nozoe, Kanagawa (JP); Takashi Iizumi, Kanagawa (JP); Kazushige Nakagawa, Kanagawa (JP); Takahiro Kato, Kanagawa (JP); Miho Asahi, Kanagawa (JP); Hirofumi Omura, Kanagawa (JP); Yuki Hirai, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 505 days.

This patent is subject to a terminal disclaimer.

(21) Appl. No.: 17/092,316

(22) Filed: Nov. 8, 2020

(65) Prior Publication Data

US 2021/0063825 A1 Mar. 4, 2021

Related U.S. Application Data

(63) Continuation of application No. PCT/JP2019/020213, filed on May 22, 2019.

(30) Foreign Application Priority Data

May 25, 2018 (JP) .................................. 2018-100688
Jun. 29, 2018 (JP) .................................. 2018-124970
Oct. 18, 2018 (JP) .................................. 2018-196909

(51) Int. Cl.
| | | |
|---|---|---|
| G02F 1/1337 | (2006.01) | |
| C08F 220/60 | (2006.01) | |
| C08F 220/32 | (2006.01) | |
| C08F 220/36 | (2006.01) | |
| G02F 1/01 | (2006.01) | |
| C08F 220/30 | (2006.01) | |

(Continued)

(52) U.S. Cl.
CPC ...... *G02F 1/133711* (2013.01); *C08F 220/30* (2013.01); *C08F 220/32* (2013.01); *C08F 220/325* (2020.02); *C08F 220/36* (2013.01); *C08F 220/365* (2020.02); *C08F 220/58* (2013.01); *C08F 220/603* (2020.02); *G02F 1/0136* (2013.01); *G02F 1/13378* (2013.01); *C08F 220/281* (2020.02); *C09K 2323/02* (2020.08); *G02F 2202/022* (2013.01)

(58) Field of Classification Search
CPC combination set(s) only.
See application file for complete search history.

(56) References Cited

U.S. PATENT DOCUMENTS

| | | | |
|---|---|---|---|
| 11,692,050 B2 * | 7/2023 | Nozoe | C08F 2/50 |
| | | | 428/1.23 |
| 2018/0246381 A1 | 8/2018 | Wakita et al. | |

(Continued)

FOREIGN PATENT DOCUMENTS

| | | |
|---|---|---|
| CN | 107406720 | 11/2017 |
| JP | S6038412 | 2/1985 |
| JP | H06509889 | 11/1994 |

(Continued)

OTHER PUBLICATIONS

"Decision of Refusal of China Counterpart Application", dated May 18, 2022, with partial English translation thereof, p. 1-p. 13.

(Continued)

*Primary Examiner* — Sophie Hon
(74) *Attorney, Agent, or Firm* — JCIPRNET

(57) ABSTRACT

An object of the invention is to provide a photo-alignment copolymer which makes it possible to produce a photo-alignment film having excellent solvent resistance and liquid crystal aligning properties, and a photo-alignment film and an optical laminate produced using the photo-alignment copolymer. A photo-alignment copolymer of the invention is a photo-alignment copolymer having a repeating unit A including a photo-alignment group represented by Formula (A) and a repeating unit B including a crosslinkable group represented by Formula (B).

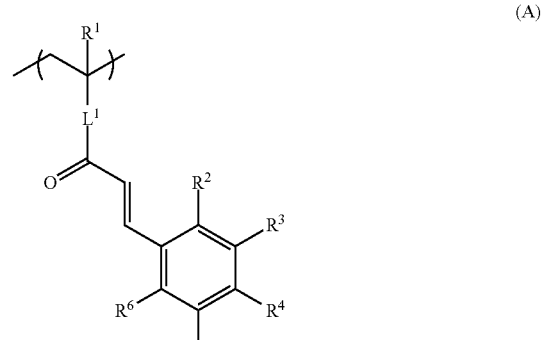

(A)

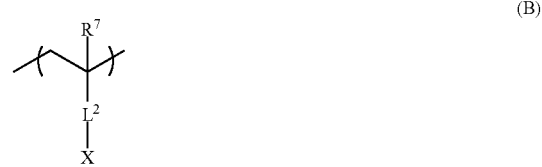

(B)

15 Claims, No Drawings

(51) Int. Cl.
    *C08F 220/58*     (2006.01)
    *C08F 220/28*     (2006.01)

(56) References Cited

U.S. PATENT DOCUMENTS

| | | | |
|---|---|---|---|
| 2020/0079885 A1 | 3/2020 | Tamura et al. | |
| 2021/0292456 A1* | 9/2021 | Nozoe | H05B 33/02 |

FOREIGN PATENT DOCUMENTS

| | | | | |
|---|---|---|---|---|
| JP | 2008083394 | | 4/2008 | |
| JP | 2012107198 | | 6/2012 | |
| JP | 2015031823 | | 2/2015 | |
| JP | 2017016116 A | * | 1/2017 | ....... G02F 1/133345 |
| JP | 7033198 B2 | * | 3/2022 | ............ C08F 220/30 |
| KR | 102467728 B1 | * | 11/2022 | ............... G02B 5/30 |
| WO | 9400797 | | 1/1994 | |
| WO | 2016143860 | | 9/2016 | |
| WO | 2017069252 | | 4/2017 | |
| WO | 2017199986 | | 11/2017 | |
| WO | 2018216812 | | 11/2018 | |
| WO | 2019003682 | | 1/2019 | |
| WO | 2019117082 | | 6/2019 | |

OTHER PUBLICATIONS

"Office Action of Korea Counterpart Application" with English translation thereof, dated Apr. 11, 2022, p. 1-p. 6.

Office Action of China Counterpart Application, with English translation thereof, dated Jan. 10, 2022, pp. 1-13.

"International Search Report (Form PCT/ISA/210) of PCT/JP2019/020213," dated Aug. 13, 2019, with English translation thereof, pp. 1-5.

"Written Opinion of the International Searching Authority (Form PCT/ISA/237) of PCT/JP2019/020213," dated Aug. 13, 2019, with English translation thereof, pp. 1-9.

* cited by examiner

PHOTO-ALIGNMENT COPOLYMER, PHOTO-ALIGNMENT FILM, AND OPTICAL LAMINATE

CROSS-REFERENCE TO RELATED APPLICATIONS

This application is a Continuation of PCT International Application No. PCT/JP2019/020213 filed on May 22, 2019, which claims priority under 35 U.S.C. § 119(a) to Japanese Patent Application No. 2018-100688 filed on May 25, 2018, Japanese Patent Application No. 2018-124970 filed on Jun. 29, 2018 and Japanese Patent Application No. 2018-196909 filed on Oct. 18, 2018. Each of the above applications is hereby expressly incorporated by reference, in its entirety, into the present application.

BACKGROUND OF THE INVENTION

1. Field of the Invention

The present invention relates to a photo-alignment copolymer, a photo-alignment film, and an optical laminate.

2. Description of the Related Art

Optical films such as optical compensation sheets or retardation films are used in various image display devices from the viewpoint of solving image staining or enlarging a view angle.

A stretched birefringence film has been used as an optical film, but in recent years, it has been proposed to use an optically anisotropic layer formed of a liquid crystal compound in place of the stretched birefringence film.

Regarding such an optically anisotropic layer, it has been known that in order to align a liquid crystal compound, an alignment film is provided on a support on which the optically anisotropic layer is to be formed. As the alignment film, a photo-alignment film subjected to a photo-alignment treatment in place of a rubbing treatment has been known.

For example, WO2017/069252A describes a photo-alignment film composition containing a polymer A having a constitutional unit a1 containing a cinnamate group and a low-molecular-weight compound B having a cinnamate group and having a smaller molecular weight than the polymer A ([claim 1]), and describes an aspect in which the polymer A has a constitutional unit a2 containing a crosslinkable group such as an epoxy group and an oxetanyl group ([0024] to [0028]).

SUMMARY OF THE INVENTION

The inventors have conducted studies on a copolymer having a constitutional unit a1 containing a cinnamate group and a constitutional unit a2 containing a crosslinkable group as the polymer A described in WO2017/069252A, and found that during the formation of an optically anisotropic layer on a photo-alignment film to be obtained, the aligning properties of the photo-alignment film may be disturbed depending on the kind of a solvent to be used, and the aligning properties of the liquid crystal compound (hereinafter, also referred to as "liquid crystal aligning properties") may be poor depending on the timing at which the optically anisotropic layer is formed.

Accordingly, an object of the invention is to provide a photo-alignment copolymer which makes it possible to produce a photo-alignment film having excellent solvent resistance and liquid crystal aligning properties, and a photo-alignment film and an optical laminate produced using the photo-alignment copolymer.

As a result of intensive studies for achieving the above object, the inventors have found that a photo-alignment film to be obtained has good solvent resistance and liquid crystal aligning properties in a case where a copolymer having a repeating unit including a specific photo-alignment group and a repeating unit including a crosslinkable group is used, and completed the invention.

That is, the inventors have found that the object can be achieved with the following configuration.

[1] A photo-alignment copolymer comprising: a repeating unit A including a photo-alignment group represented by Formula (A); and a repeating unit B including a crosslinkable group represented by Formula (B).

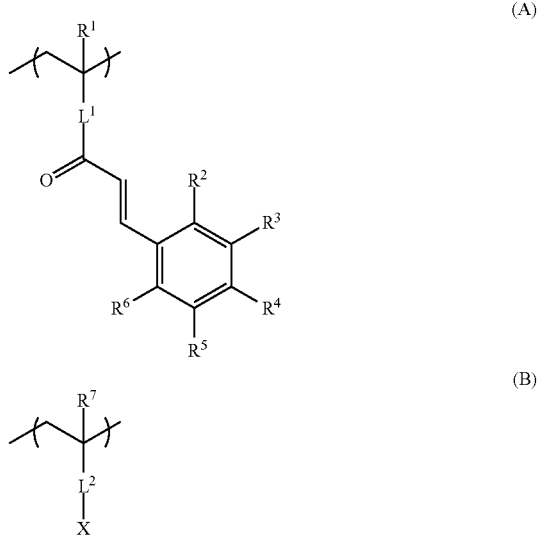

In Formula (A), $R^1$ represents a hydrogen atom or a methyl group. $L^1$ represents a divalent linking group including a nitrogen atom and a cycloalkane ring, and a part of carbon atoms constituting the cycloalkane ring may be substituted with a hetero atom selected from the group consisting of nitrogen, oxygen, and sulfur. $R^2$, $R^3$, $R^4$, $R^5$, and $R^6$ each independently represent a hydrogen atom or a substituent, and among $R^2$, $R^3$, $R^4$, $R^5$, and $R^6$, two adjacent groups may be bonded to form a ring.

In Formula (B), $R^7$ represents a hydrogen atom or a methyl group, $L^2$ represents a divalent linking group, and X represents a crosslinkable group.

[2] The photo-alignment copolymer according to [1], in which X in Formula (B) is at least one crosslinkable group selected from the group consisting of Formulae (X1) to (X4).

(X2)

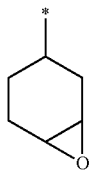

(X3)

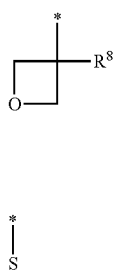

(X4)

*—S

In Formulae (X1) to (X4), * represents a bonding position with $L^2$ in Formula (B), $R^8$ represents any one of a hydrogen atom, a methyl group, or an ethyl group, and S in Formula (X4) represents a functional group having an ethylenically unsaturated double bond.

[3] The photo-alignment copolymer according to [2], in which the repeating unit B includes a repeating unit in which X in Formula (B) is a crosslinkable group represented by any one of Formula (X1), Formula (X2), or Formula (X3) and a repeating unit in which X in Formula (B) is a crosslinkable group represented by Formula (X4).

[4] The photo-alignment copolymer according to any one of [1] to [3], in which $L^2$ in Formula (B) is a divalent linking group formed by combining at least two selected from the group consisting of a linear, branched, or cyclic alkylene group having 1 to 18 carbon atoms and optionally having a substituent, an arylene group having 6 to 12 carbon atoms and optionally having a substituent, an ether group, a carbonyl group, and an imino group optionally having a substituent.

[5] The photo-alignment copolymer according to any one of [1] to [4], in which $L^1$ in Formula (A) is a divalent linking group represented by any one of Formula (1), . . . , or Formula (10).

(1)

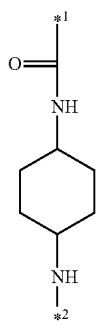

(2)

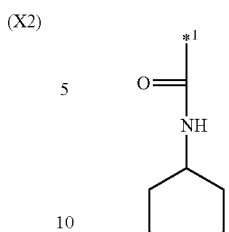

(3)

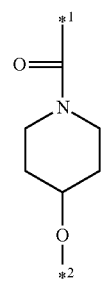

(4)

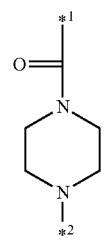

(5)

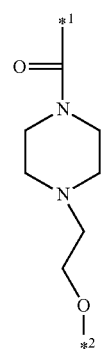

(6)

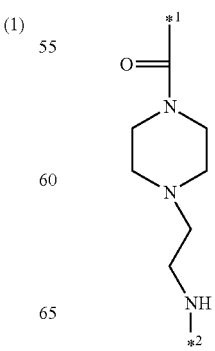

-continued

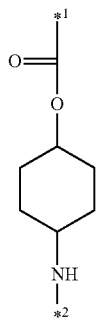
(7)

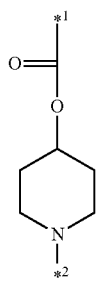
(8)

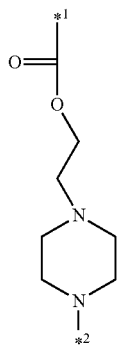
(9)

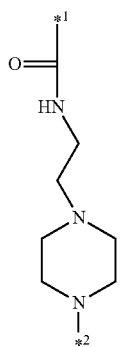
(10)

In Formulae (1) to (10), *1 represents a bonding position with a carbon atom constituting a main chain in Formula (A), and *2 represents a bonding position with a carbon atom constituting a carbonyl group in Formula (A).

[6] The photo-alignment copolymer according to [5], in which $L^1$ in Formula (A) is a divalent linking group represented by any one of Formula (2), Formula (3), Formula (7), or Formula (8).

[7] The photo-alignment copolymer according to any one of [1] to [6], in which at least $R^4$ among $R^2$, $R^3$, $R^4$, $R^5$, and $R^6$ in Formula (A) represents a substituent.

[8] The photo-alignment copolymer according to [7], in which $R^2$, $R^3$, $R^5$, and $R^6$ in Formula (A) all represent a hydrogen atom.

[9] The photo-alignment copolymer according to [7] or [8], in which $R^4$ in Formula (A) is an electron-donating substituent.

[10] The photo-alignment copolymer according to [9], in which $R^4$ in Formula (A) is an alkoxy group having 6 to 16 carbon atoms.

[11] The photo-alignment copolymer according to any one of [1] to [10], in which the substituents represented by $R^2$, $R^3$, $R^4$, $R^5$, and $R^6$ in Formula (A) each independently represent a halogen atom, a linear, branched, or cyclic alkyl group having 1 to 20 carbon atoms, a linear halogenated alkyl group having 1 to 20 carbon atoms, an alkoxy group having 1 to 20 carbon atoms, an aryl group having 6 to 20 carbon atoms, an aryloxy group having 6 to 20 carbon atoms, a cyano group, an amino group, or a group represented by Formula (11).

(11)

In Formula (11), * represents a bonding position with a benzene ring in Formula (A), and $R^9$ represents a monovalent organic group.

[12] The photo-alignment copolymer according to any one of [1] to [11], in which a content a of the repeating unit A and a content b of the repeating unit B satisfy Formula (12) by mass ratio.

$$0.03 \leq a/(a+b) \leq 0.5 \qquad (12)$$

[13] The photo-alignment copolymer according to [12], in which the content a of the repeating unit A and the content b of the repeating unit B satisfy Formula (13) by mass ratio.

$$0.03 \leq a/(a+b) \leq 0.3 \qquad (13)$$

[14] The photo-alignment copolymer according to [12], in which the content a of the repeating unit A and the content b of the repeating unit B satisfy Formula (14) by mass ratio.

$$0.03 \leq a/(a+b) \leq 0.2 \qquad (14)$$

[15] The photo-alignment copolymer according to any one of [1] to [14], in which a weight-average molecular weight is 10,000 to 500,000.

[16] The photo-alignment copolymer according to [15], in which the weight-average molecular weight is 30,000 to 300,000.

[17] A photo-alignment film which is formed using a photo-alignment film composition containing the photo-alignment copolymer according to any one of [1] to [16].

[18] An optical laminate comprising: the photo-alignment film according to [17]; and an optically anisotropic layer which is formed using a liquid crystal composition containing a liquid crystal compound.

According to an aspect of the invention, it is possible to provide a photo-alignment copolymer which makes it possible to produce a photo-alignment film having excellent solvent resistance and liquid crystal aligning properties, and a photo-alignment film and an optical laminate produced using the photo-alignment copolymer.

DESCRIPTION OF THE PREFERRED EMBODIMENTS

Hereinafter, the invention will be described in detail.

The following description of constituent requirements is based on typical embodiments of the invention, but the invention is not limited thereto.

In this specification, a numerical value range expressed using "to" means a range including numerical values before and after "to" as a lower limit value and an upper limit value.

[Photo-Alignment Copolymer]

A photo-alignment copolymer according to the embodiment of the invention is a photo-alignment copolymer having a repeating unit A including a photo-alignment group represented by Formula (A) and a repeating unit B including a crosslinkable group represented by Formula (B).

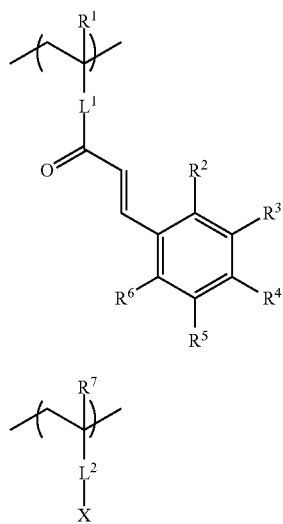

(A)

(B)

In Formula (A), $R^1$ represents a hydrogen atom or a methyl group. $L^1$ represents a divalent linking group including a nitrogen atom and a cycloalkane ring, and a part of carbon atoms constituting the cycloalkane ring may be substituted with a hetero atom selected from the group consisting of nitrogen, oxygen, and sulfur. $R^2$, $R^3$, $R^4$, $R^5$, and $R^6$ each independently represent a hydrogen atom or a substituent, and among $R^2$, $R^3$, $R^4$, $R^5$, and $R^6$, two adjacent groups may be bonded to form a ring.

In Formula (B), $R^7$ represents a hydrogen atom or a methyl group, $L^2$ represents a divalent linking group, and X represents a crosslinkable group.

In the invention, a photo-alignment film to be obtained has good solvent resistance and liquid crystal aligning properties in a case where a photo-alignment copolymer having a repeating unit A including a photo-alignment group represented by Formula (A) and a repeating unit B including a crosslinkable group represented by Formula (B) is used.

The details thereof are not clear, but the inventors presume as follows.

That is, it is thought that since the divalent linking group represented by $L^1$ in Formula (A) includes a nitrogen atom and a cycloalkane ring, hydrogen bonding properties and molecular rigidity are increased, and thus molecular motion is suppressed and the solvent resistance is thereby improved.

Similarly, it is thought that since the divalent linking group represented by $L^1$ in Formula (A) includes a nitrogen atom and a cycloalkane ring, a glass transition temperature of the copolymer is increased, temporal stability of a photo-alignment film to be obtained is improved, and as a result, the liquid crystal aligning properties are improved regardless of the timing at which an optically anisotropic layer is formed.

Next, the divalent linking group including a nitrogen atom and a cycloalkane ring, which is represented by $L^1$ in Formula (A), will be described. In the invention, as described above, a part of carbon atoms constituting the cycloalkane ring may be substituted with a hetero atom selected from the group consisting of nitrogen, oxygen, and sulfur. In addition, in a case where a part of carbon atoms constituting the cycloalkane ring is substituted with a nitrogen atom, no nitrogen atom may be contained separately from the cycloalkane ring.

The cycloalkane ring included in the divalent linking group represented by $L^1$ in Formula (A) is preferably a cycloalkane ring having 6 or more carbon atoms, and specific examples thereof include a cyclohexane ring, a cycloheptane ring, a cyclooctane ring, a cyclododecane ring, and a cyclodocosane ring.

In the invention, $L^1$ in Formula (A) is preferably a divalent linking group represented by any one of Formula (1), . . . , or Formula (10) since the liquid crystal aligning properties are improved.

(1)

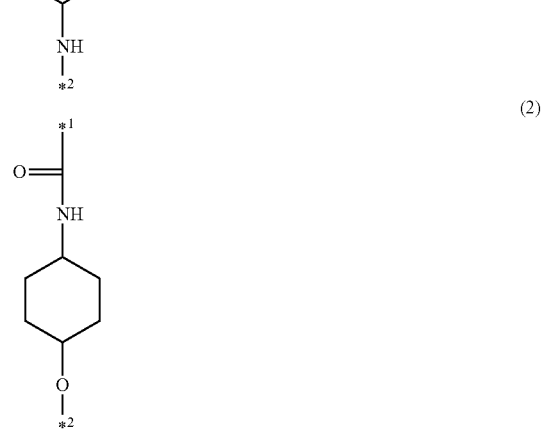

(2)

(3)

(4)
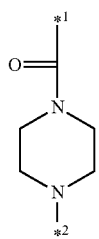

(5)
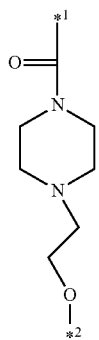

(6)
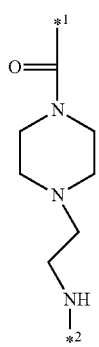

(7)
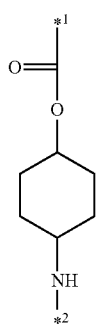

(8)
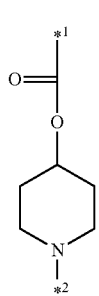

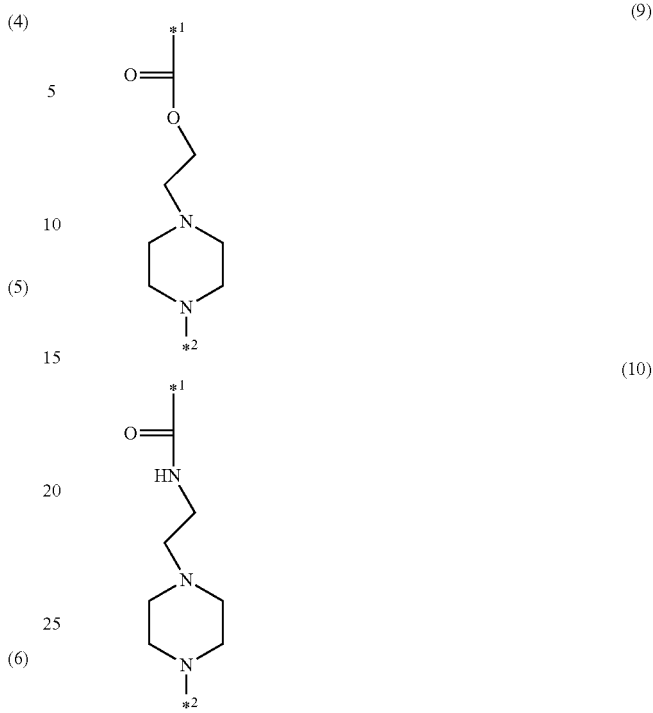

In Formulae (1) to (10), *1 represents a bonding position with a carbon atom constituting a main chain in Formula (A), and *2 represents a bonding position with a carbon atom constituting a carbonyl group in Formula (A).

Among the divalent linking groups each represented by any one of Formula (1), . . . , or Formula (10), a divalent linking group represented by any one of Formula (2), Formula (3), Formula (7), or Formula (8) is preferable since the balance between the solubility in a solvent to be used during the formation of a photo-alignment film and the solvent resistance of a photo-alignment film to be obtained is improved.

Next, substituents represented by an aspect of $R^2$, $R^3$, $R^4$, $R^5$, and $R^6$ in Formula (A) will be described. As described above, $R^2$, $R^3$, $R^4$, $R^5$, and $R^6$ in Formula (A) may be hydrogen atoms instead of substituents.

Since the photo-alignment group is easy to interact with the liquid crystal compound, and the liquid crystal aligning properties are thus improved, the substituents represented by an aspect of $R^2$, $R^3$, $R^4$, $R^5$, and $R^6$ in Formula (A) each independently preferably represent a halogen atom, a linear, branched, or cyclic alkyl group having 1 to 20 carbon atoms, a linear halogenated alkyl group having 1 to 20 carbon atoms, an alkoxy group having 1 to 20 carbon atoms, an aryl group having 6 to 20 carbon atoms, an aryloxy group having 6 to 20 carbon atoms, a cyano group, an amino group, or a group represented by Formula (11).

(11)

Here, in Formula (11), * represents a bonding position with a benzene ring in Formula (A), and $R^9$ represents a monovalent organic group.

Examples of the halogen atom include a fluorine atom, a chlorine atom, a bromine atom, and an iodine atom. Among these, a fluorine atom and a chlorine atom are preferable.

Regarding the linear, branched, or cyclic alkyl group having 1 to 20 carbon atoms, the linear alkyl group is preferably an alkyl group having 1 to 6 carbon atoms. Specific examples thereof include a methyl group, an ethyl group, and an n-propyl group.

The branched alkyl group is preferably an alkyl group having 3 to 6 carbon atoms, and specific examples thereof include an isopropyl group and a tert-butyl group.

The cyclic alkyl group is preferably an alkyl group having 3 to 6 carbon atoms, and specific examples thereof include a cyclopropyl group, a cyclopentyl group, and a cyclohexyl group.

The linear halogenated alkyl group having 1 to 20 carbon atoms is preferably a fluoroalkyl group having 1 to 4 carbon atoms, and specific examples thereof include a trifluoromethyl group, a perfluoroethyl group, a perfluoropropyl group, and a perfluorobutyl group. Among these, a trifluoromethyl group is preferable.

The alkoxy group having 1 to 20 carbon atoms is preferably an alkoxy group having 1 to 18 carbon atoms, more preferably an alkoxy group having 6 to 18 carbon atoms, and even more preferably an alkoxy group having 6 to 14 carbon atoms. Specifically, suitable examples thereof include a methoxy group, an ethoxy group, an n-butoxy group, a methoxyethoxy group, an n-hexyloxy group, an n-octyloxy group, an n-decyloxy group, an n-dodecyloxy group, and an n-tetradecyloxy group, and an n-hexyloxy group, an n-octyloxy group, an n-decyloxy group, an n-dodecyloxy group, and an n-tetradecyloxy group are more preferable.

The aryl group having 6 to 20 carbon atoms is preferably an aryl group having 6 to 12 carbon atoms, and specific examples thereof include a phenyl group, an α-methylphenyl group, and a naphthyl group. Among these, a phenyl group is preferable.

The aryloxy group having 6 to 20 carbon atoms is preferably an aryloxy group having 6 to 12 carbon atoms, and specific examples thereof include a phenyloxy group and a 2-naphthyloxy group. Among these, a phenyloxy group is preferable.

Examples of the amino group include: primary amino groups (—NH$_2$); secondary amino groups such as a methylamino group; and tertiary amino groups such as a dimethylamino group, a diethylamino group, a dibenzylamino group, and a group having a nitrogen atom of a nitrogen-containing heterocyclic compound (for example, pyrrolidine, piperidine, and piperazine) as a bond.

Regarding the group represented by Formula (11), examples of the monovalent organic group represented by $R^9$ in Formula (11) include a linear or cyclic alkyl group having 1 to 20 carbon atoms.

The linear alkyl group is preferably an alkyl group having 1 to 6 carbon atoms, and specific examples thereof include a methyl group, an ethyl group, and an n-propyl group. Among these, a methyl group or an ethyl group is preferable.

The cyclic alkyl group is preferably an alkyl group having 3 to 6 carbon atoms, and specific examples thereof include a cyclopropyl group, a cyclopentyl group, and a cyclohexyl group. Among these, a cyclohexyl group is preferable.

The monovalent organic group represented by $R^9$ in Formula (11) may be obtained by combining the linear alkyl group and the cyclic alkyl group described above directly or via a single bond.

In the invention, since the photo-alignment group is easy to interact with the liquid crystal compound, and the liquid crystal aligning properties are thus improved, at least $R^4$ among $R^2$, $R^3$, $R^4$, $R^5$, and $R^6$ in Formula (A) preferably represents the above-described substituent. Moreover, since the linearity of a photo-alignment copolymer to be obtained is improved, the interaction with the liquid crystal compound is made easier, and the liquid crystal aligning properties are thus improved, it is more preferable that $R^2$, $R^3$, $R^5$, and $R^6$ all represent a hydrogen atom.

In the invention, $R^4$ in Formula (A) is preferably an electron-donating substituent since the reaction efficiency is improved in a case where a photo-alignment film to be obtained is irradiated with light.

Here, the electron-donating substituent (electron-donating group) refers to a substituent having a Hammett value (Hammett substituent constant σp) of 0 or less, and an alkyl group, a halogenated alkyl group, an alkoxy group, and the like are exemplified among the above-described substituents.

Among these, an alkoxy group is preferable. Since the liquid crystal aligning properties are improved, an alkoxy group having 6 to 16 carbon atoms is more preferable, and an alkoxy group having 7 to 10 carbon atoms is even more preferable.

Next, the divalent linking group represented by $L^2$ in Formula (B) will be described.

Since the photo-alignment group is easy to interact with the liquid crystal compound, and the liquid crystal aligning properties are thus improved, the divalent linking group is preferably a divalent linking group formed by combining at least two selected from the group consisting of a linear, branched, or cyclic alkylene group having 1 to 18 carbon atoms and optionally having a substituent, an arylene group having 6 to 12 carbon atoms and optionally having a substituent, an ether group (—O—), a carbonyl group (—C(=O)—), and an imino group (—NH—) optionally having a substituent.

Here, examples of the substituent that the alkylene group, the arylene group, and the imino group may have include a halogen atom, an alkyl group, an alkoxy group, an aryl group, an aryloxy group, a cyano group, a carboxy group, an alkoxycarbonyl group, and a hydroxyl group.

Examples of the halogen atom include a fluorine atom, a chlorine atom, a bromine atom, and an iodine atom. Among these, a fluorine atom and a chlorine atom are preferable.

The alkyl group is, for example, preferably a linear, branched, or cyclic alkyl group having 1 to 18 carbon atoms, more preferably an alkyl group having 1 to 8 carbon atoms (for example, a methyl group, an ethyl group, a propyl group, an isopropyl group, an n-butyl group, an isobutyl group, a sec-butyl group, a t-butyl group, a cyclohexyl group, and the like), even more preferably an alkyl group having 1 to 4 carbon atoms, and particularly preferably a methyl group or an ethyl group.

The alkoxy group is, for example, preferably an alkoxy group having 1 to 18 carbon atoms, more preferably an alkoxy group having 1 to 8 carbon atoms (for example, a methoxy group, an ethoxy group, an n-butoxy group, a methoxyethoxy group, and the like), even more preferably an alkoxy group having 1 to 4 carbon atoms, and particularly preferably a methoxy group or an ethoxy group.

Examples of the aryl group include an aryl group having 6 to 12 carbon atoms. Specific examples thereof include a phenyl group, an α-methylphenyl group, and a naphthyl group. Among these, a phenyl group is preferable.

Examples of the aryloxy group include phenoxy, naphthoxy, imidazoyloxy, benzimidazoyloxy, pyridin-4-yloxy, pyrimidinyloxy, quinazolinyloxy, purinyloxy, and thiophen-3-yloxy.

Examples of the alkoxycarbonyl group include methoxycarbonyl and ethoxycarbonyl.

Regarding the linear, branched, or cyclic alkylene group having 1 to 18 carbon atoms, specific examples of the linear alkylene group include a methylene group, an ethylene group, a propylene group, a butylene group, a pentylene group, a hexylene group, a decylene group, an undecylene group, a dodecylene group, a tridecylene group, a tetradecylene group, a pentadecylene group, a hexadecylene group, a heptadecylene group, and an octadecylene group.

Specific examples of the branched alkylene group include a dimethylmethylene group, a methylethylene group, a 2,2-dimethylpropylene group, and a 2-ethyl-2-methylpropylene group.

Specific examples of the cyclic alkylene group include a cyclopropylene group, a cyclobutylene group, a cyclopentylene group, a cyclohexylene group, a cyclooctylene group, a cyclodecylene group, an adamantane-diyl group, a norbornane-diyl group, and an exo-tetrahydrodicyclopentadiene-diyl group. Among these, a cyclohexylene group is preferable.

Specific examples of the arylene group having 6 to 12 carbon atoms include a phenylene group, a xylylene group, a biphenylene group, a naphthylene group, and a 2,2'-methylenebisphenyl group. Among these, a phenylene group is preferable.

Next, the crosslinkable group represented by X in Formula (B) will be described.

Specific examples of X (crosslinkable group) in Formula (B) include an epoxy group, an epoxycyclohexyl group, an oxetanyl group, and a functional group having an ethylenically unsaturated double bond. Among these, at least one crosslinkable group selected from the group consisting of Formulae (X1) to (X4) is preferable.

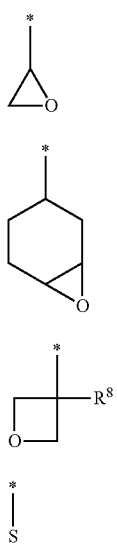

(X1)

(X2)

(X3)

(X4)

In Formulae (X1) to (X4), * represents a bonding position with $L^2$ in Formula (B), $R^8$ represents any one of a hydrogen atom, a methyl group, or an ethyl group, and S in Formula (X4) represents a functional group having an ethylenically unsaturated double bond.

Here, specific examples of the functional group having an ethylenically unsaturated double bond include a vinyl group, an allyl group, a styryl group, an acryloyl group, and a methacryloyl group, and an acryloyl group or a methacryloyl group is preferable.

In the invention, the repeating unit B preferably includes a repeating unit in which X in Formula (B) is a crosslinkable group represented by any one of Formulae (X1), Formula (X2), or Formula (X3) (hereinafter, also abbreviated as "repeating unit B1") and a repeating unit in which X in Formula (B) is a crosslinkable group represented by Formula (X4) (hereinafter, also abbreviated as "repeating unit B2") since the strength of an optical laminate according to the embodiment of the invention to be described later is increased and handleability during the formation of other layers using the optical laminate according to the embodiment of the invention to be described later is thus improved.

Specific examples of the repeating unit A including a photo-alignment group represented by Formula (A) include the following repeating units A-1 to A-44. In the following formulae, Me represents a methyl group and Et represents an ethyl group. In the following specific examples, the "1,4-cyclohexyl group" contained in the divalent linking group of the repeating units A-1 to A-10 may be either a cis-form or a trans-form, and is preferably a trans-form.

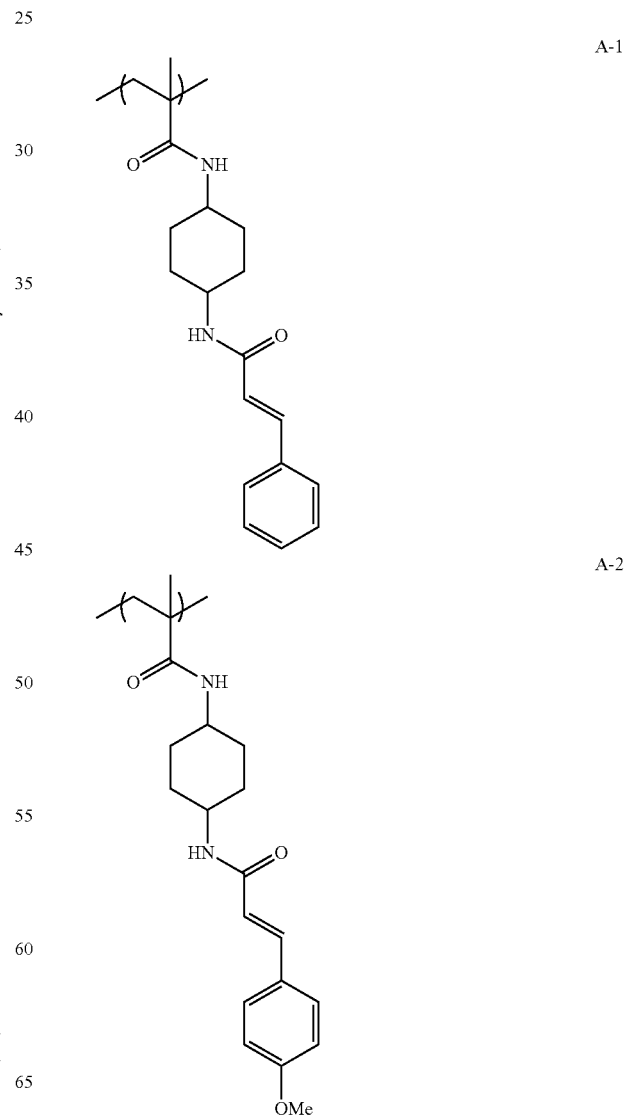

A-3
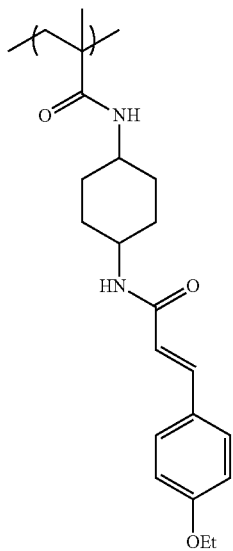
A-4
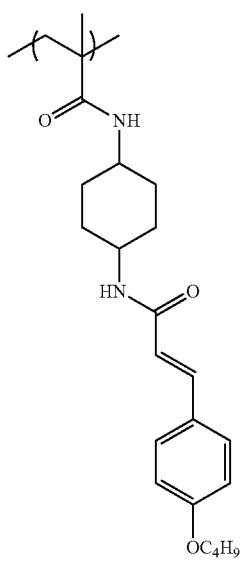
A-5
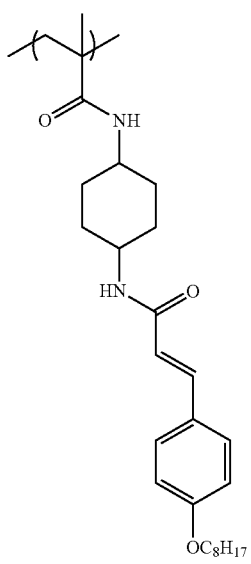
A-6
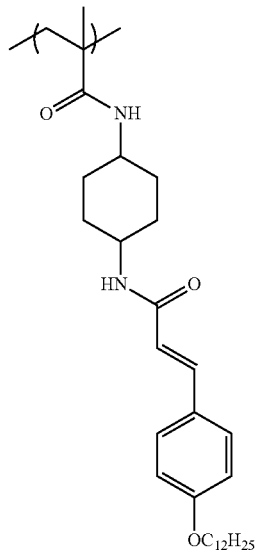
A-7
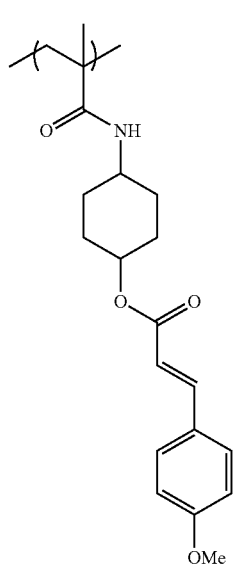
A-8
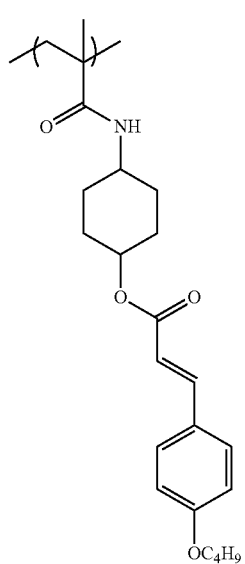

A-9
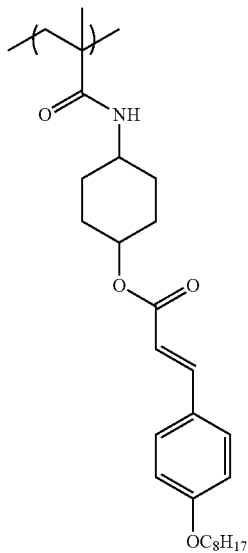
A-10
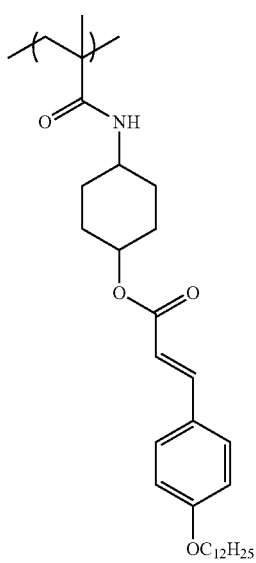
A-11
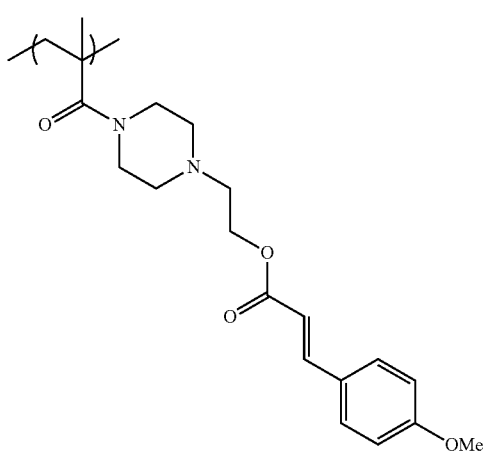
A-12
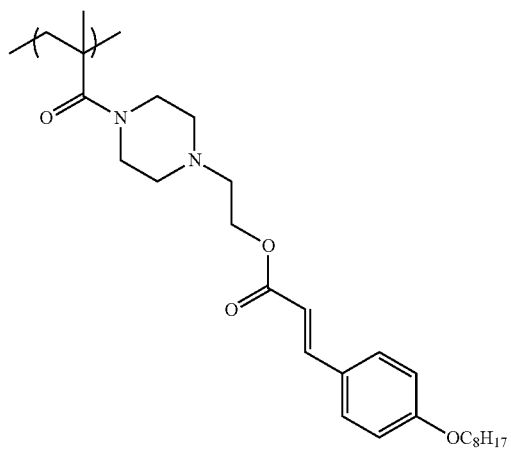
A-13
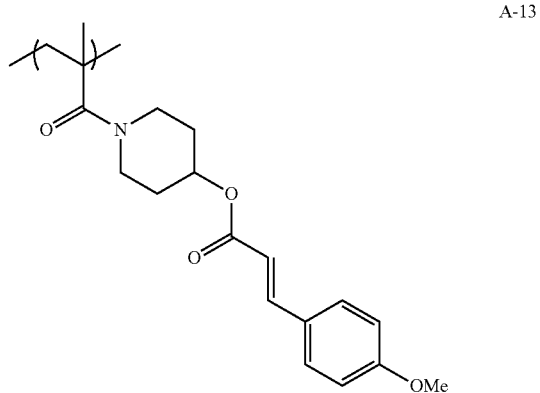
A-14
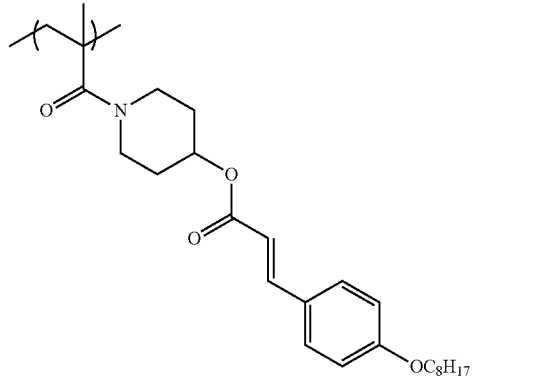
A-15
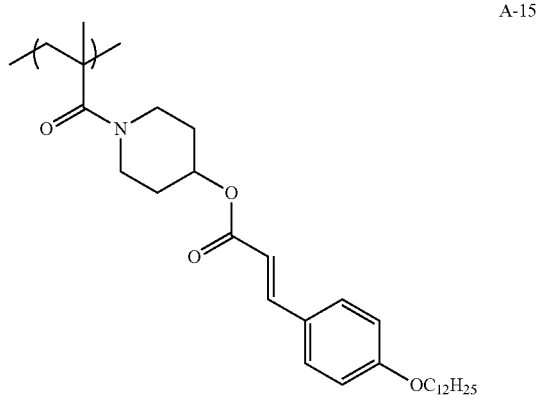

A-16
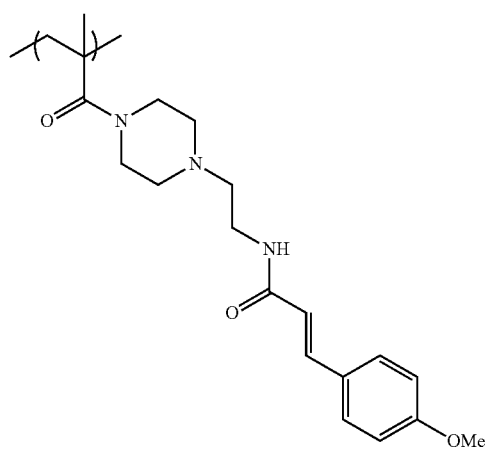
A-17
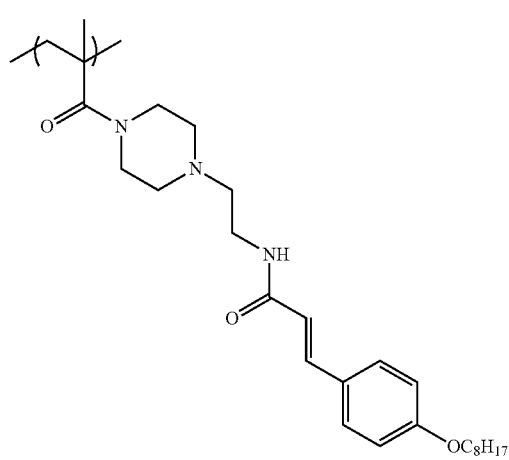
A-18
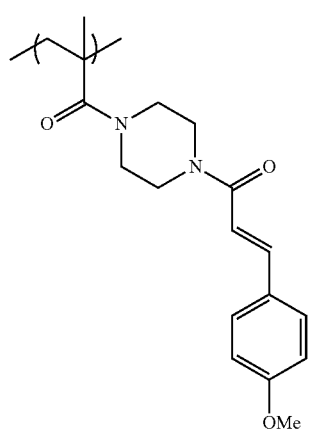
A-19
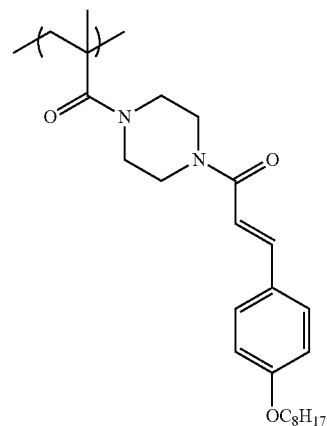
A-20
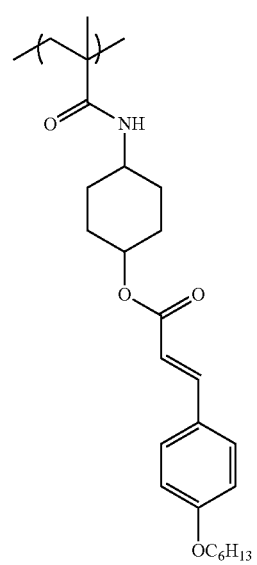
A-21
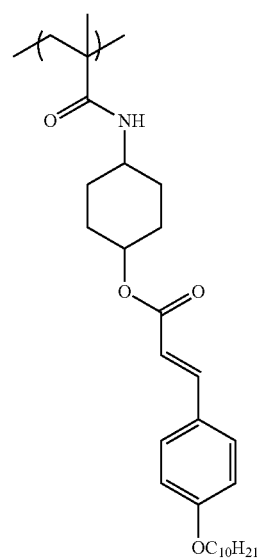

A-22
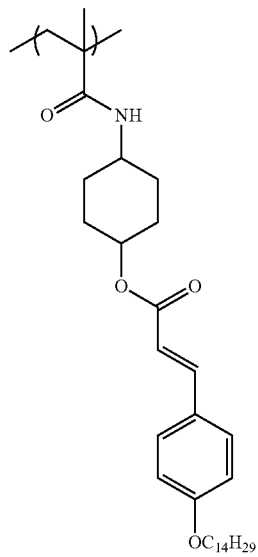
A-23
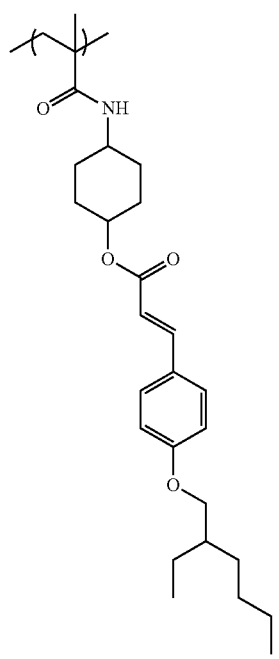
A-24
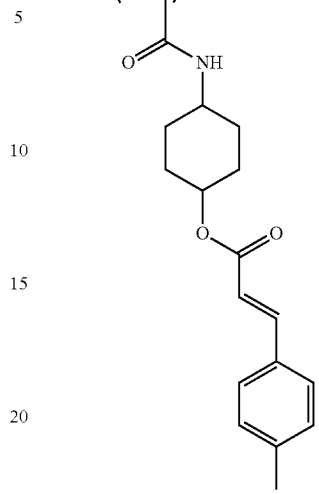
A-25
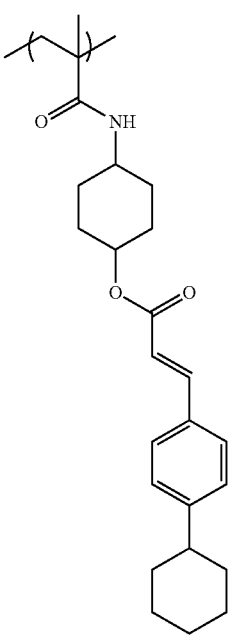

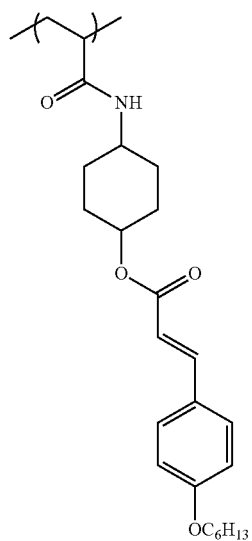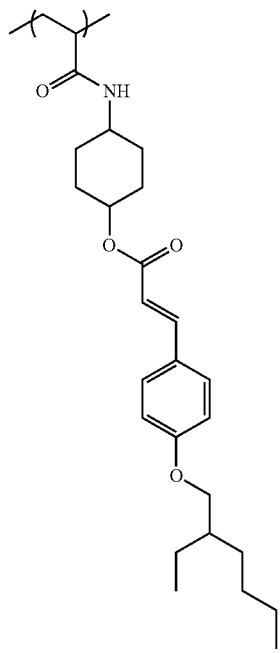

A-31
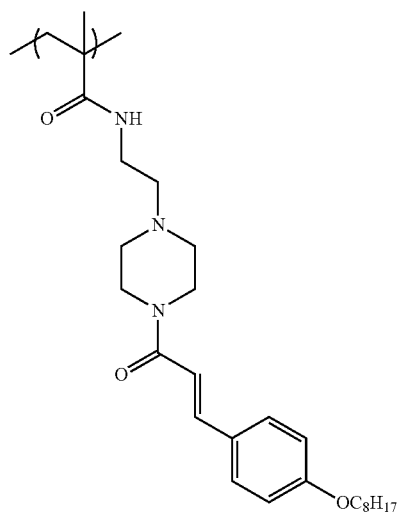
A-32
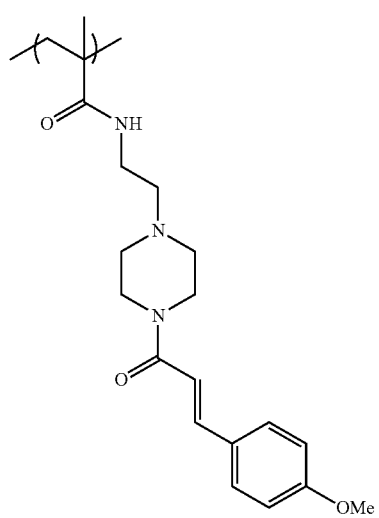
A-33
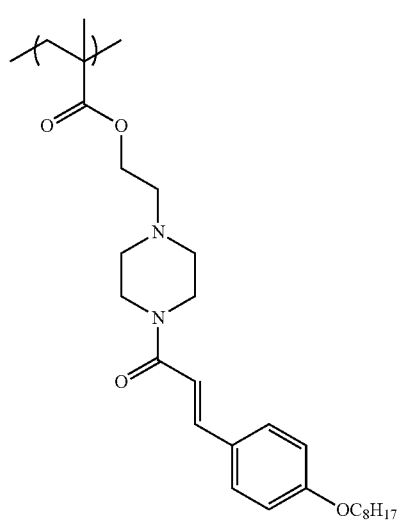
A-34
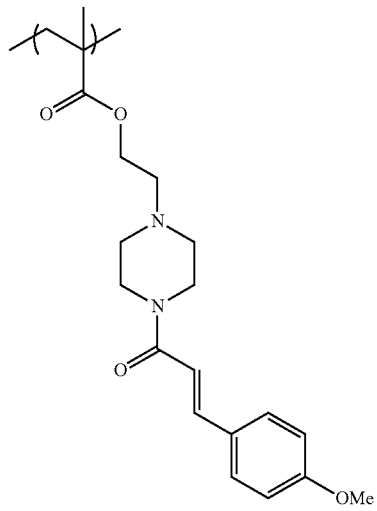
A-35
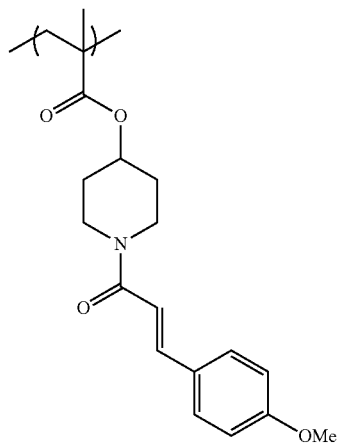
A-36
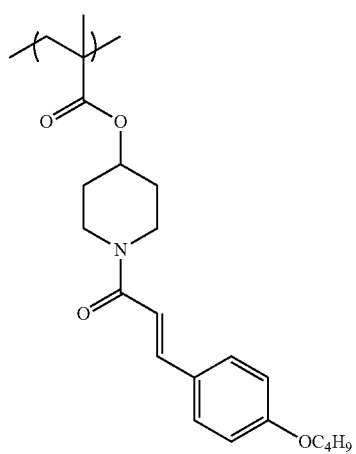

A-37
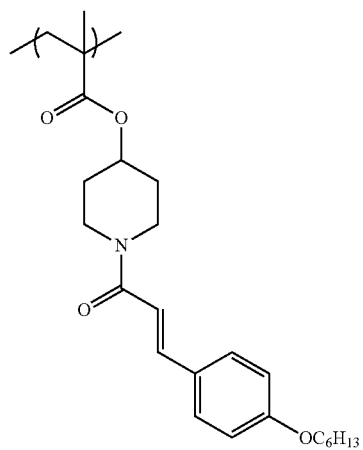
A-38
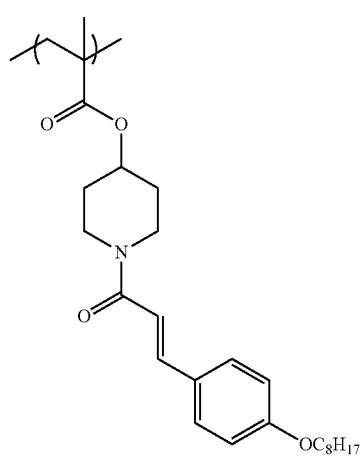
A-39
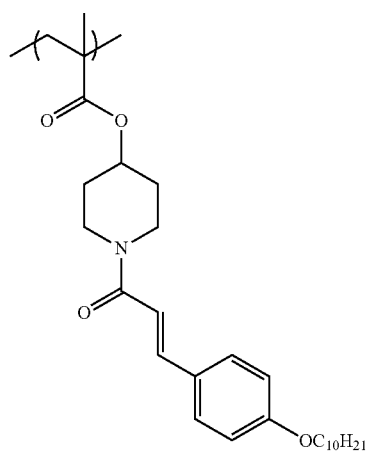
A-40
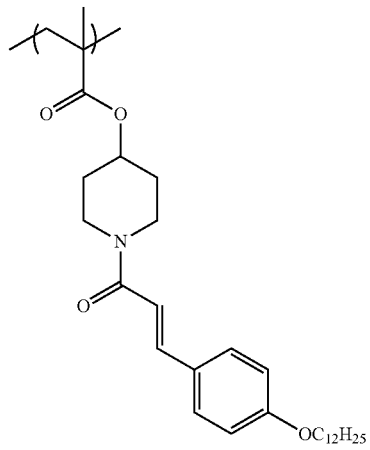
A-41
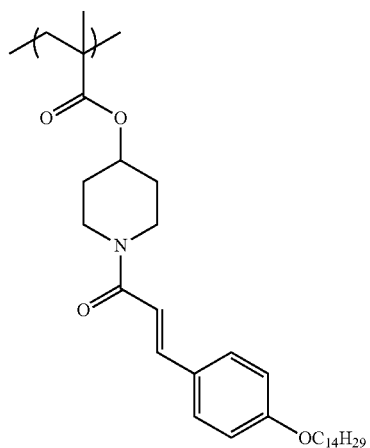
A-42
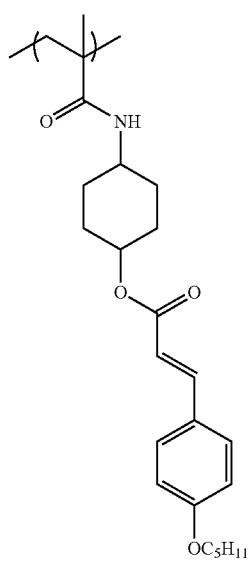

A-43
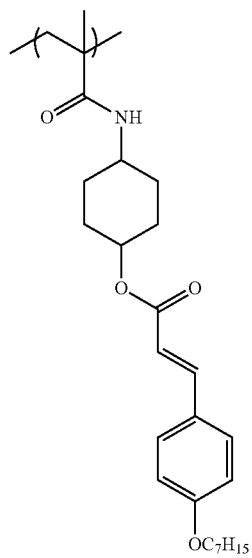
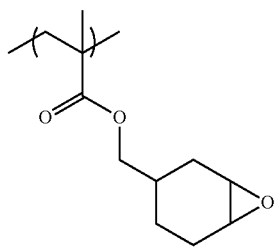
B-2
A-44
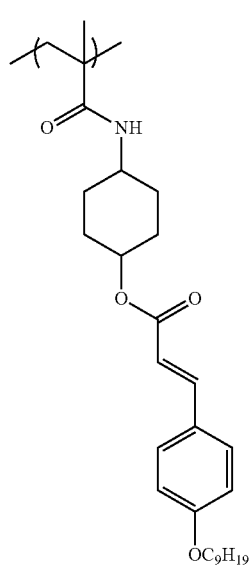
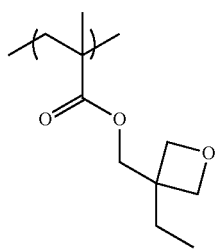
B-3
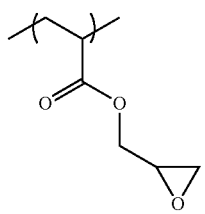
B-4
Specific examples of the repeating unit B (repeating unit B1) including a crosslinkable group represented by Formula (B) include the following repeating units B-1 to B-17.
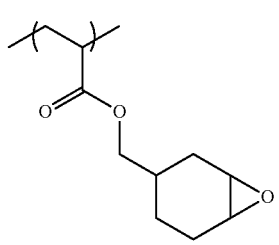
B-5
B-1
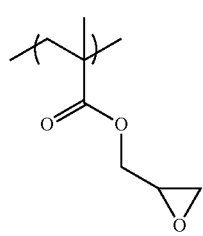
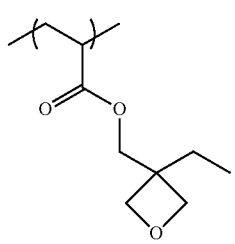
B-6

-continued
B-7
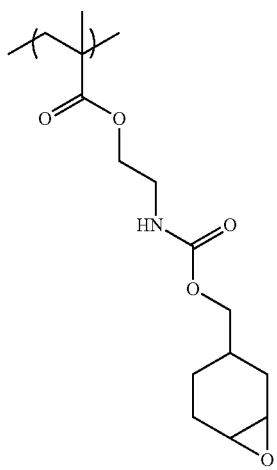
B-8
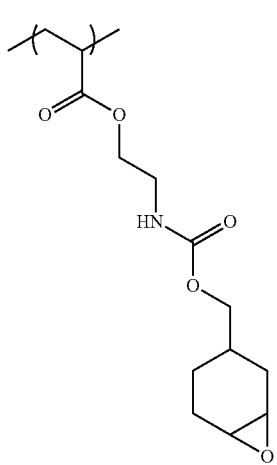
B-9
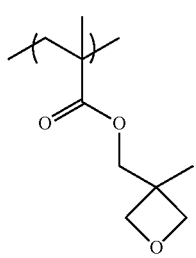
B-10
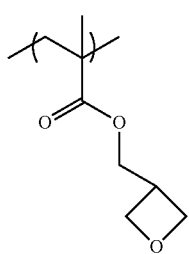
B-11
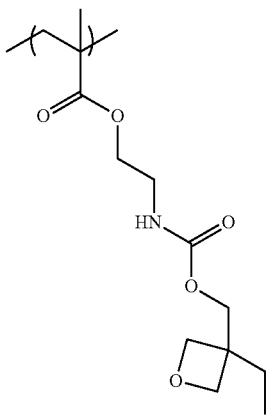
B-12
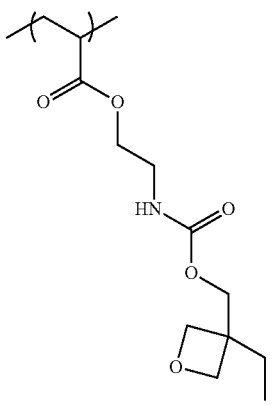
B-13
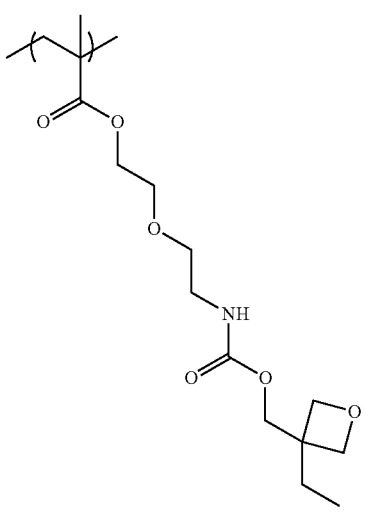

-continued
B-14
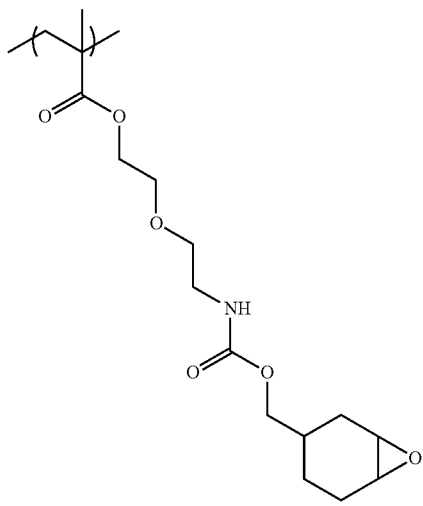
B-15
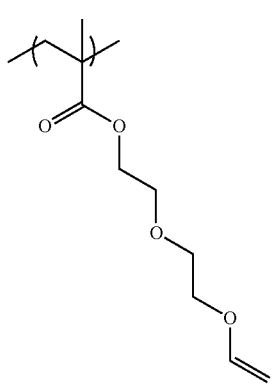
B-16
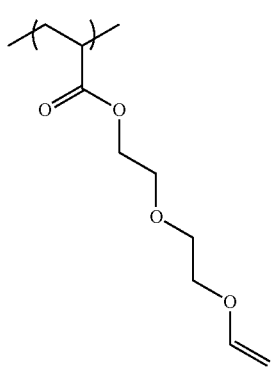
B-17
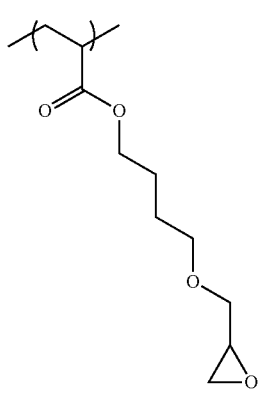
Specific examples of the repeating unit B (repeating unit B2) including a crosslinkable group represented by Formula (B) include the following repeating units B-18 to B-47.
B-18
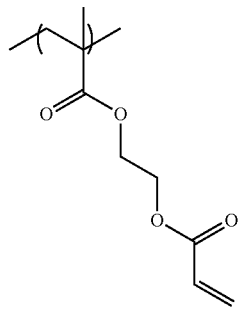
B-19
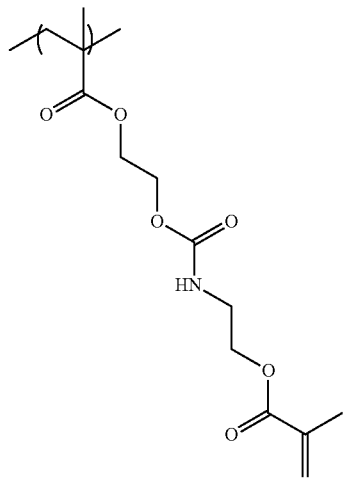
B-20
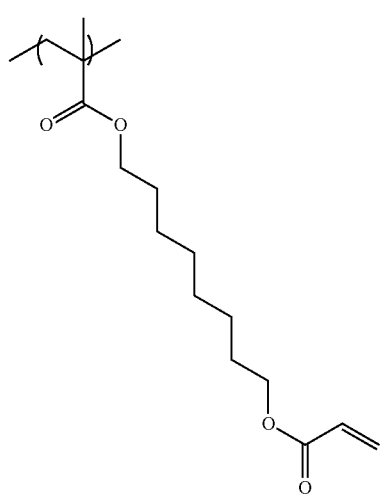

B-21
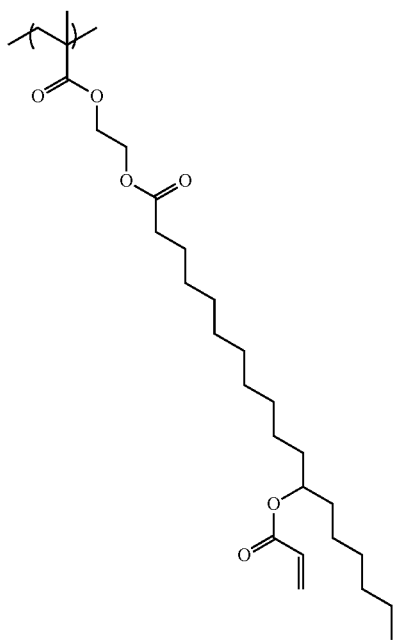
B-22
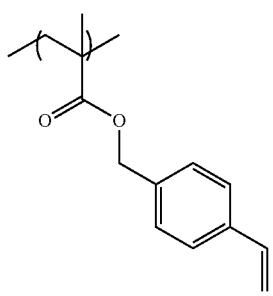
B-23
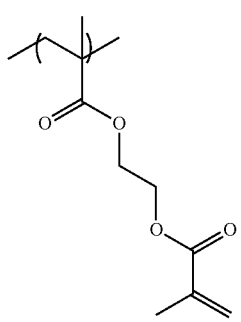
B-24
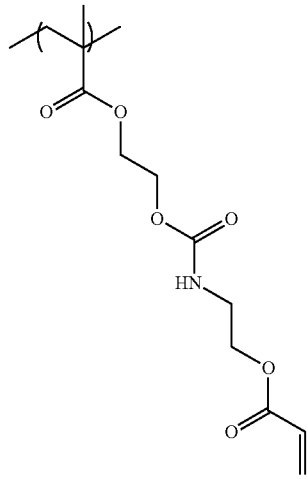
B-25
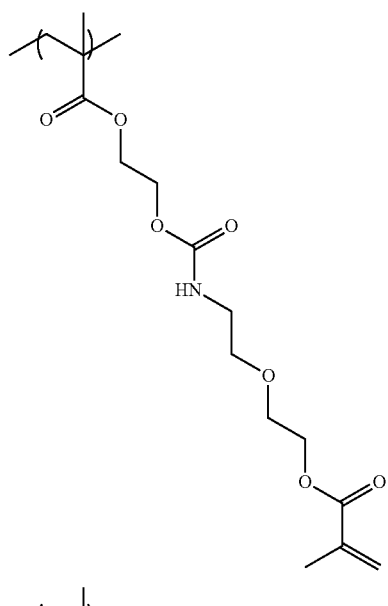
B-26: n = 2
B-27: n = 4.5
B-28: n = 8
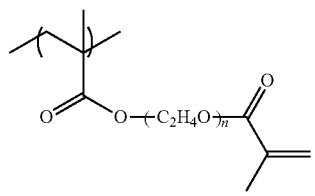
B-29: n = 2
B-30: n = 4.5
B-31: n = 8

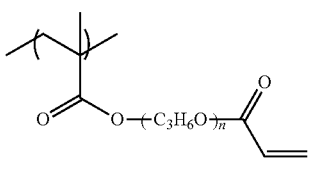

B-32: n = 4~6
B-33: n = 4.5
B-34: n = 8

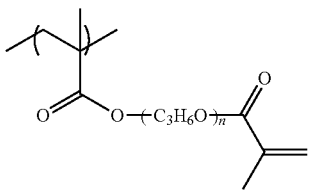

B-35 n = 4~6
B-36: n = 4.5
B-37: n = 8

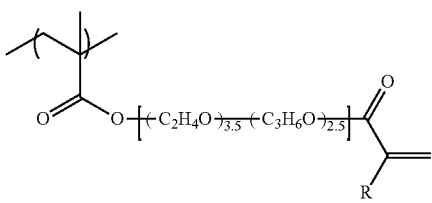

B-38: R = H
B-39: R = CH$_3$

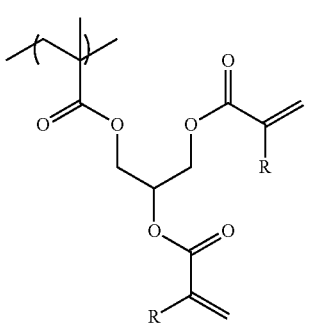

B-40: R = H
B-41: R = CH$_3$

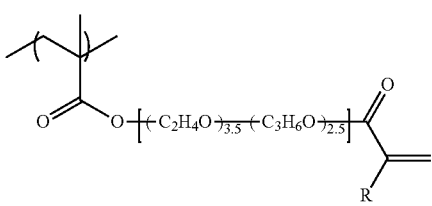

B-42: R = H
B-43: R = CH$_3$

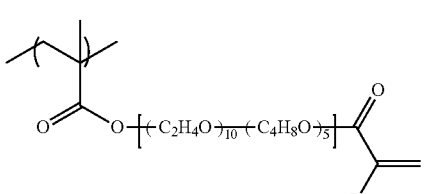

B-44: R = H
B-45: R = CH$_3$

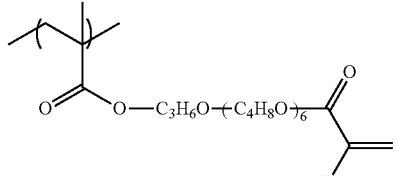

B-46: R = H
B-47: R = CH$_3$

In the photo-alignment copolymer according to the embodiment of the invention, a content a of the above-described repeating unit A and a content b of the above-described repeating unit B preferably satisfy, by mass ratio, Formula (12), more preferably Formula (13), even more preferably Formula (14), and particularly preferably Formula (15).

$$0.03 \leq a/(a+b) \leq 0.5 \quad (12)$$

$$0.03 \leq a/(a+b) \leq 0.3 \quad (13)$$

$$0.03 \leq a/(a+b) \leq 0.2 \quad (14)$$

$$0.05 \leq a/(a+b) \leq 0.2 \quad (15)$$

In a case where the photo-alignment copolymer according to the embodiment of the invention has the above-described repeating unit B2 together with the above-described repeating unit B1, the content a of the above-described repeating unit A, a content b1 of the above-described repeating unit B1, and a content b2 of the above-described repeating unit B2 preferably satisfy, by mass ratio, Formula (16), and more preferably Formula (17) since it is possible to increase the strength of an optically anisotropic layer including a photo-alignment film while maintaining good liquid crystal aligning properties and adhesiveness.

$$0.05 \leq b2/(a+b1+b2) \leq 0.7 \quad (16)$$

$$0.10 \leq b2/(a+b1+b2) \leq 0.5 \quad (17)$$

The photo-alignment copolymer according to the embodiment of the invention may have other repeating units other than the repeating unit A and the repeating unit B described above, as long as the effects of the invention are not impaired.

Examples of the monomers (radically polymerizable monomers) forming other repeating units include an acrylic acid ester compound, a methacrylic acid ester compound, a maleimide compound, an acrylamide compound, acrylonitrile, maleic anhydride, a styrene compound, and a vinyl compound.

The method of synthesizing the photo-alignment copolymer according to the embodiment of the invention is not particularly limited. For example, the photo-alignment copolymer can be synthesized by mixing a monomer forming the above-described repeating unit A, a monomer forming the above-described repeating unit B, and monomers forming other optional repeating units, and polymerizing the monomers using a radical polymerization initiator in an organic solvent.

The weight-average molecular weight (Mw) of the photo-alignment copolymer according to the embodiment of the invention is preferably 10,000 to 500,000, and more preferably 30,000 to 300,000 since the liquid crystal aligning properties are improved.

Here, in the invention, the weight-average molecular weight and the number-average molecular weight are values measured by gel permeation chromatography (GPC) under the following conditions.

Solvent (eluent): Tetrahydrofuran (THF)
Device Name: TOSOH HLC-8320GPC
Column: Three columns of TOSOH TSKgel Super HZM-H (4.6 mm×15 cm) are connected and used.
Column Temperature: 40° C.
Sample Concentration: 0.1 mass %
Flow Rate: 1.0 ml/min
Calibration Curve: A calibration curve made by 7 samples of TSK standard polystyrene manufactured by TOSOH Corporation, Mw of which is 2,800,000 to 1,050 (Mw/Mn=1.03 to 1.06), is used.

[Photo-Alignment Film]

A photo-alignment film according to the embodiment of the invention is a photo-alignment film formed using a photo-alignment film composition (hereinafter, also formally referred to as "photo-alignment film composition of the invention") containing the above-described photo-alignment copolymer according to the embodiment of the invention.

The thickness of the photo-alignment film is not particularly limited, and can be appropriately selected according to the purpose. The thickness of the film is preferably 10 to 1,000 nm, and more preferably 10 to 700 nm.

The content of the photo-alignment copolymer according to the embodiment of the invention in the photo-alignment film composition of the invention is not particularly limited. In a case where an organic solvent to be described later is contained, the content of the photo-alignment copolymer is preferably 0.1 to 50 parts by mass, and more preferably 0.5 to 10 parts by mass with respect to 100 parts by mass of the organic solvent.

The photo-alignment film composition of the invention preferably contains an organic solvent from the viewpoint of workability or the like for producing a photo-alignment film.

Specific examples of the organic solvent include ketones (for example, acetone, 2-butanone, methyl isobutyl ketone, cyclohexanone, and cyclopentanone), ethers (for example, dioxane and tetrahydrofuran), aliphatic hydrocarbons (for example, hexane), alicyclic hydrocarbons (for example, cyclohexane), aromatic hydrocarbons (for example, toluene, xylene, and trimethylbenzene), halogenated carbons (for example, dichloromethane, dichloroethane, dichlorobenzene, and chlorotoluene), esters (for example, methyl acetate, ethyl acetate, and butyl acetate), water, alcohols (for example, ethanol, isopropanol, butanol, and cyclohexanol), cellosolves (for example, methyl cellosolve and ethyl cellosolve), cellosolve acetates, sulfoxides (for example, dimethyl sulfoxide), and amides (for example, dimethylformamide and dimethyl acetamide). These may be used alone or in combination of two or more kinds thereof.

The photo-alignment film composition of the invention may contain components other than the above components, and examples thereof include a crosslinking catalyst, an adhesion enhancing agent, a leveling agent, a surfactant, and a plasticizer.

[Photo-Alignment Film Manufacturing Method]

The photo-alignment film according to the embodiment of the invention can be manufactured by a manufacturing method which has been known, except that the above-described photo-alignment film composition of the invention is used. For example, the photo-alignment film can be produced by a manufacturing method having a coating step of coating the above-described photo-alignment film composition of the invention on a surface of a support and a light irradiation step of irradiating a surface of the coating film of the photo-alignment film composition with polarized or unpolarized light in an oblique direction.

The support will be described in the description of an optical laminate according to the embodiment of the invention to be described later.

<Coating Step>

In the coating step, the coating method is not particularly limited, and can be appropriately selected according to the purpose. Examples thereof include spin coating, die coating, gravure coating, flexographic printing, and inkjet printing.

<Light Irradiation Step>

In the light irradiation step, the polarized light which is irradiated on the coating film of the photo-alignment film composition is not particularly limited. Examples thereof include linearly polarized light, circularly polarized light, and elliptically polarized light, and among these, linearly polarized light is preferable.

The "oblique direction" in which irradiation with unpolarized light is performed is not particularly limited as long as it is a direction inclined at a polar angle $\theta$ ($0°<\theta<90°$) with respect to a normal direction of the surface of the coating film. 0 can be appropriately selected according to the purpose, and is preferably 20° to 80°.

The wavelength of polarized light or unpolarized light is not particularly limited as long as a capability of controlling alignment of liquid crystalline molecules can be imparted to the coating film of the photo-alignment film composition. For example, ultraviolet rays, near-ultraviolet rays, visible rays, or the like are used. Among these, near-ultraviolet rays with a wavelength of 250 nm to 450 nm are particularly preferable.

Examples of the light source for the irradiation with polarized light or unpolarized light include a xenon lamp, a high-pressure mercury lamp, an extra-high-pressure mercury lamp, and a metal halide lamp. By using an interference filter, a color filter, or the like with respect to ultraviolet rays or visible rays obtained from the light source, the wavelength range of the irradiation can be restricted. In addition, linearly polarized light can be obtained by using a polarization filter or a polarization prism with respect to the light from the light source.

The integrated light quantity of polarized light or unpolarized light is not particularly limited as long as a capability of controlling alignment of liquid crystalline molecules can be imparted to the coating film of the photo-alignment film composition. The integrated light quantity is preferably 1 to 300 mJ/cm$^2$, and more preferably 5 to 100 mJ/cm$^2$.

The illuminance of polarized light or unpolarized light is not particularly limited as long as a capability of controlling alignment of liquid crystalline molecules can be imparted to the coating film of the photo-alignment film composition. The illuminance is preferably 0.1 to 300 mW/cm$^2$, and more preferably 1 to 100 mW/cm$^2$.

[Optical Laminate]

An optical laminate according to the embodiment of the invention is an optical laminate which has the above-described photo-alignment film according to the embodiment of the invention and an optically anisotropic layer formed using a liquid crystal composition containing a liquid crystal compound.

The optical laminate according to the embodiment of the invention preferably further has a support. Specifically, the optical laminate preferably has the support, the photo-alignment film, and the optically anisotropic layer in this order.

[Optically Anisotropic Layer]

The optically anisotropic layer of the optical laminate according to the embodiment of the invention is not particularly limited as long as it is an optically anisotropic layer containing a liquid crystal compound. An optically anisotropic layer which has been known can be appropriately employed and used.

Such an optically anisotropic layer is preferably a layer obtained by curing a composition containing a liquid crystal compound having a polymerizable group (hereinafter, also referred to as "optically anisotropic layer forming composition"). The optically anisotropic layer may have a single layer structure or a structure including a lamination of a plurality of layers (laminate).

Hereinafter, a liquid crystal compound and predetermined additives contained in the optically anisotropic layer forming composition will be described.

<Liquid Crystal Compound>

The liquid crystal compound contained in the optically anisotropic layer forming composition is a liquid crystal compound having a polymerizable group.

In general, liquid crystal compounds can be classified into a rod-like type and a disk-like type according to the shape thereof. Further, each type includes a low molecular type and a high molecular type. The term high molecular generally refers to a compound having a degree of polymerization of 100 or greater (Polymer Physics-Phase Transition Dynamics, written by Masao Doi, p. 2, published by Iwanami Shoten, 1992).

In the invention, any type of liquid crystal compound can be used, but a rod-like liquid crystal compound or a discotic liquid crystal compound is preferably used, and a rod-like liquid crystal compound is more preferably used.

In the invention, in order to fix the above-described liquid crystal compound, a liquid crystal compound having a polymerizable group is used, and it is preferable that the liquid crystal compound has two or more polymerizable groups in one molecule. In a case where a mixture of two or more kinds of liquid crystal compounds is used, at least one liquid crystal compound preferably has two or more polymerizable groups in one molecule. After the fixing of the liquid crystal compound by polymerization, it is not necessary for the compound to exhibit crystallinity.

The kind of the polymerizable group is not particularly limited. A functional group allowing an addition polymerization reaction is preferable, and a polymerizable ethylenically unsaturated group or a ring-opening polymerizable group is preferable. More specifically, preferable examples thereof include a (meth)acryloyl group, a vinyl group, a styryl group, and an allyl group, and a (meth)acryloyl group is more preferable. A (meth)acryloyl group means both of a methacryloyl group and an acryloyl group.

As the rod-like liquid crystal compound, for example, those described in claim 1 of JP1999-513019A (JP-H11-513019A) or paragraphs [0026] to [0098] of JP2005-289980A can be preferably used, and as the discotic liquid crystal compound, for example, those described in paragraphs [0020] to [0067] of JP2007-108732A or paragraphs [0013] to [0108] of JP2010-244038A can be preferably used, but the liquid crystal compounds are not limited thereto.

In the invention, as the liquid crystal compound, a liquid crystal compound having reciprocal wavelength dispersibility can be used.

Here, in this specification, the liquid crystal compound having "reciprocal wavelength dispersibility" refers to the fact that in the measurement of an in-plane retardation (Re) value at a specific wavelength (visible light range) of a retardation film produced using the liquid crystal compound, as the measurement wavelength increases, the Re value becomes equal or higher.

The liquid crystal compound having reciprocal wavelength dispersibility is not particularly limited as long as a film having reciprocal wavelength dispersibility can be formed as described above, and for example, compounds represented by Formula (I) described in JP2008-297210A (particularly, compounds described in paragraphs [0034] to [0039]), compounds represented by Formula (1) described in JP2010-084032A (particularly, compounds described in paragraphs [0067] to [0073]), compounds represented by Formula (II) described in JP2016-053709A (particularly, compounds described in paragraphs [0036] to [0043]), and compounds represented by Formula (1) described in JP2016-081035A (particularly, compounds described in paragraphs [0043] to [0055]) can be used.

Particularly preferable examples of the liquid crystal compound having reciprocal wavelength dispersibility include compounds represented by Formulae (21) to (32), and specifically, examples of K (side chain structure) in Formulae (21) to (32) include compounds having a side chain structure shown in the following Tables 1 and 2.

In the following Tables 1 and 2, "*" shown in the side chain structure represented by K represents a bonding position with an aromatic ring.

In the side chain structures represented by 1-2 in Table 1 and 2-2 in Table 2, a group adjacent to an acryloyloxy group and a group adjacent to a methacryloyl group represent a propylene group (a group in which a methyl group is substituted with an ethylene group), and represent a mixture of positional isomers having different methyl group positions.

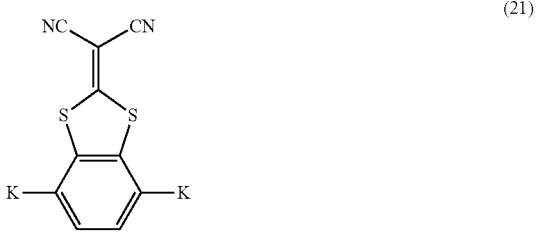

(21)

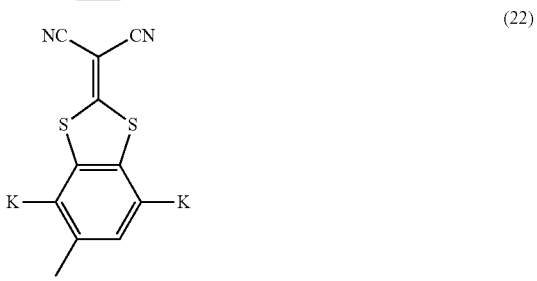

(22)

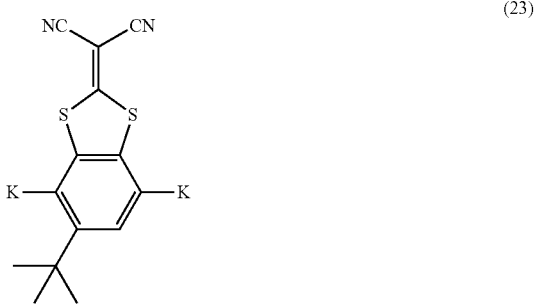

(23)

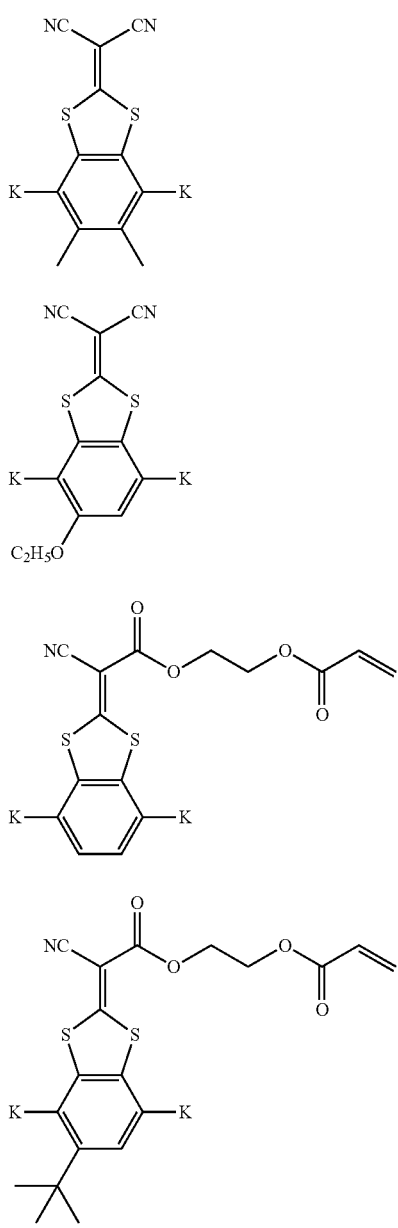
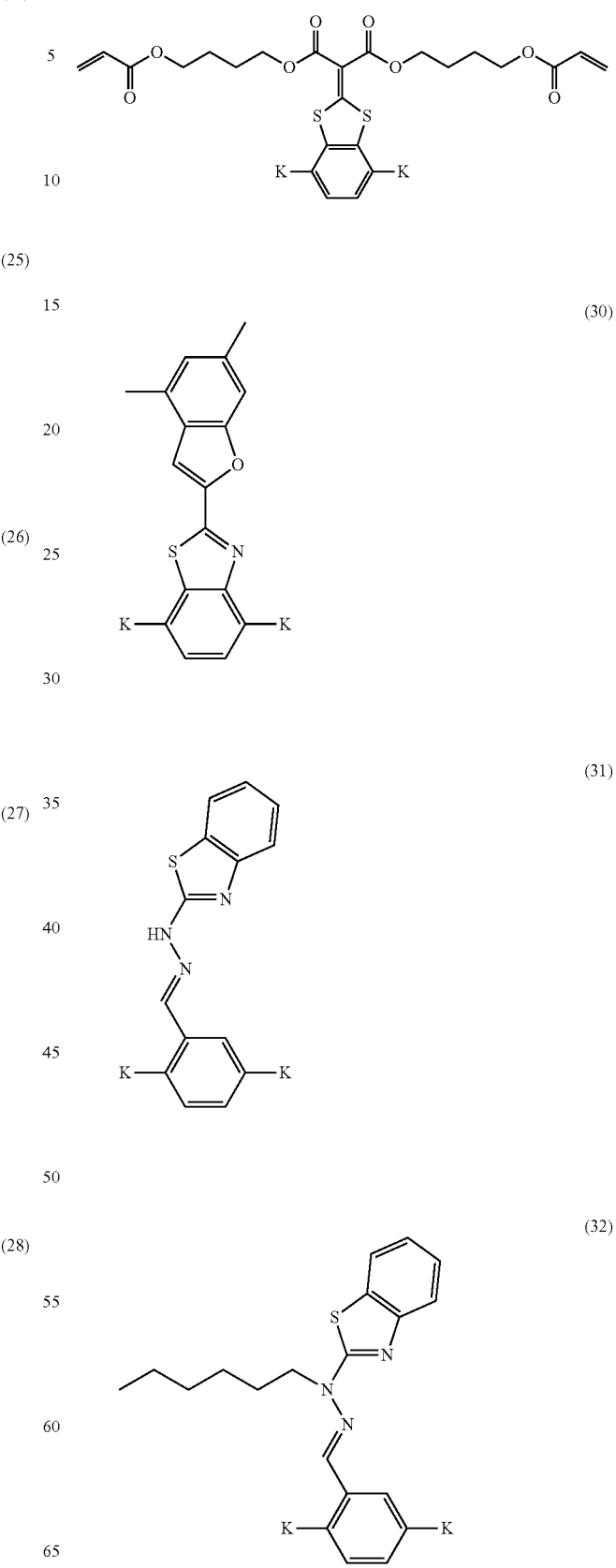

TABLE 1
| | K (side chain structure) |
|---|---|
| 1-1 | 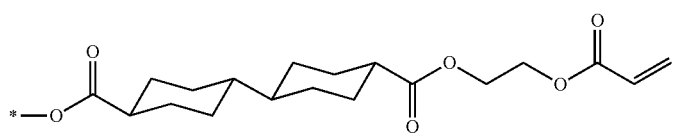 |
| 1-2 | 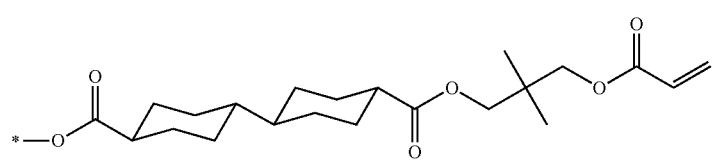 |
| 1-3 | 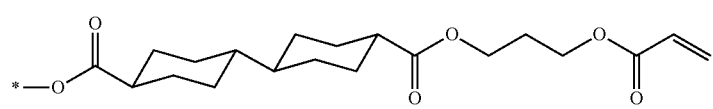 |
| 1-4 | 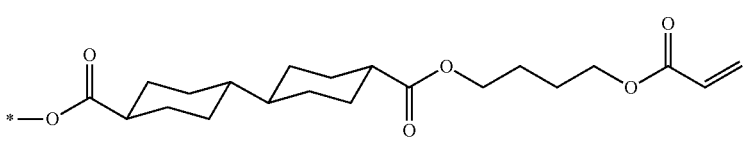 |
| 1-5 | 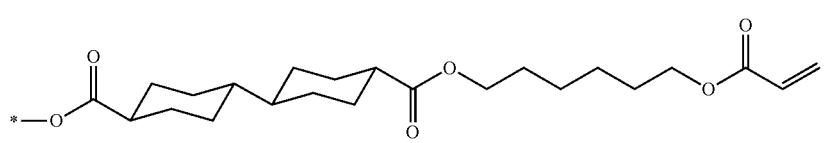 |
| 1-6 | 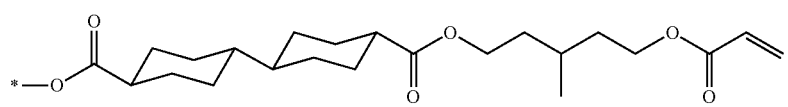 |
| 1-7 | 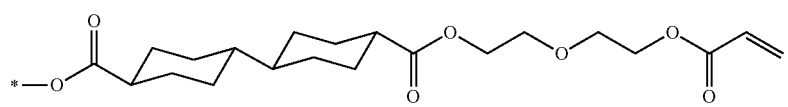 |
| 1-8 | 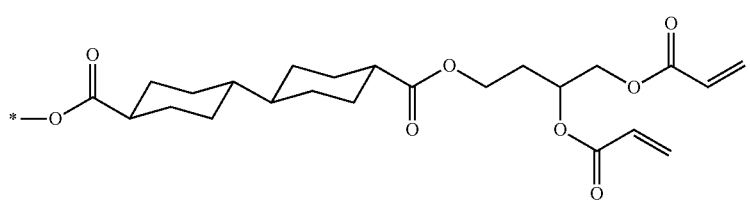 |
| 1-9 | 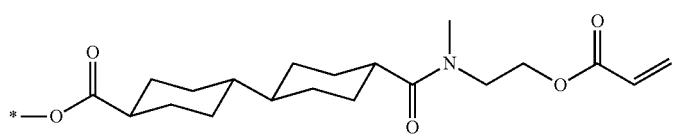 |
| 1-10 | 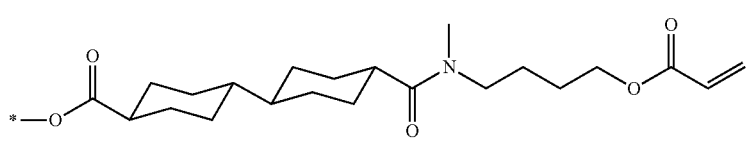 |
| 1-11 | 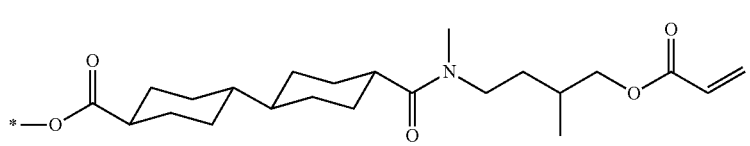 |

TABLE 1-continued
K (side chain structure)
1-12 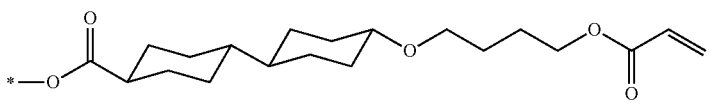
1-13 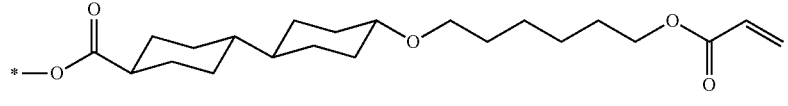
1-14 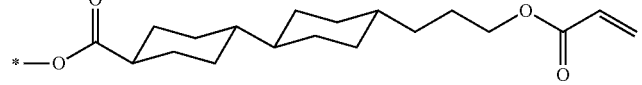
TABLE 2
K (side chain structure)
2-1 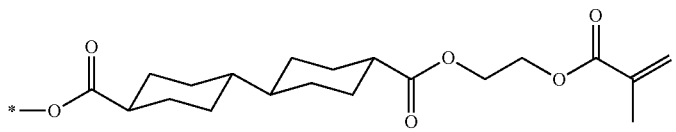
2-2 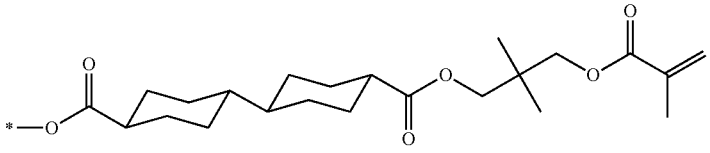
2-3 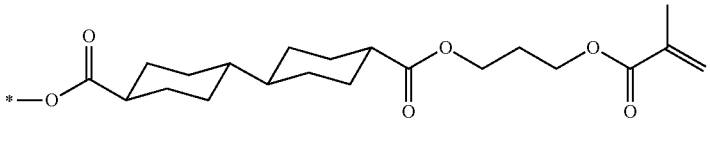
2-4 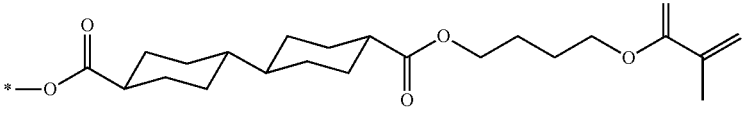
2-5 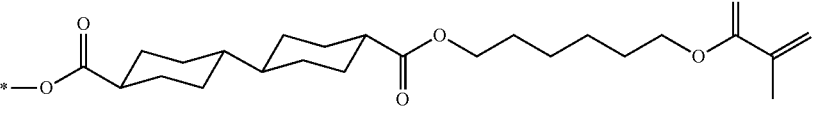
2-6 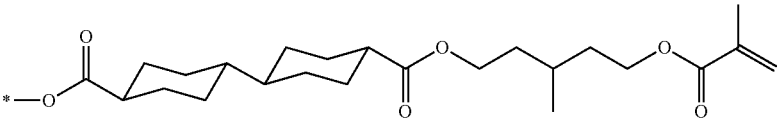
2-7 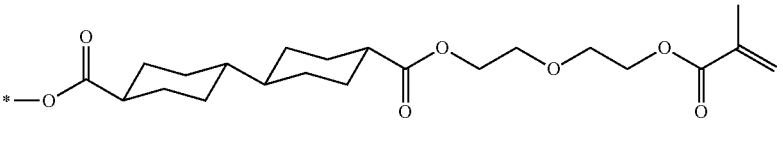

TABLE 2-continued

K (side chain structure)

2-8

2-9

2-10

2-11

2-12

2-13

2-14

<Additives>

The optically anisotropic layer forming composition may include a compound other than the above-described liquid crystal compound.

For example, the optically anisotropic layer forming composition may include a polymerization initiator. A polymerization initiator to be used is selected according to the form of the polymerization reaction, and examples thereof include a thermal polymerization initiator and a photopolymerization initiator. Examples of the photopolymerization initiator include α-carbonyl compound, acyloin ether, α-hydrocarbon-substituted aromatic acyloin compound, polynuclear quinone compound, and combination of triaryl imidazole dimer and p-aminophenyl ketone.

The amount of the polymerization initiator to be used is preferably 0.01 to 20 mass %, and more preferably 0.5 to 5 mass % with respect to the total solid content of the composition.

The optically anisotropic layer forming composition may contain a polymerizable monomer in view of the uniformity of the coating film and the hardness of the film.

Examples of the polymerizable monomer include a radical polymerizable or cation polymerizable compound. A polyfunctional radical polymerizable monomer is preferable, and the polymerizable monomer is preferably copolymerizable with the above-described liquid crystal compound containing a polymerizable group. Examples thereof include those described in paragraphs [0018] to [0020] of JP2002-296423A.

The content of the polymerizable monomer is preferably 1 to 50 mass %, and more preferably 2 to 30 mass % with respect to the total mass of the liquid crystal compound.

The optically anisotropic layer forming composition may contain a surfactant in view of the uniformity of the coating film and the hardness of the film.

Examples of the surfactant include compounds which have been known, and a fluorine-based compound is particularly preferable. Specific examples thereof include compounds described in paragraphs [0028] to [0056] of JP2001-330725A and compounds described in paragraphs [0069] to [0126] of JP2005-062673A.

The optically anisotropic layer forming composition may contain a dichroic substance from the viewpoint of causing the optically anisotropic layer to function as a polarizer.

The dichroic substance is not particularly limited, and examples thereof include visible light absorbing substances (dichroic dyes), light emitting substances (fluorescent substances, phosphorescent substances), ultraviolet absorbing substances, infrared absorbing substances, non-linear optical substances, carbon nanotubes, and inorganic substances (for example, quantum rods), and a dichroic substance (dichroic dye) which has been known can be used.

Specific examples thereof include those described in paragraphs [0067] to [0071] of JP2013-228706A, paragraphs [0008] to [0026] of JP2013-227532A, paragraphs [0008] to of JP2013-209367A, paragraphs [0045] to [0058] of JP2013-014883A, paragraphs [0012] to [0029] of JP2013-109090A, paragraphs [0009] to [0017] of JP2013-101328A, paragraphs [0051] to [0065] of JP2013-037353A, paragraphs [0049] to [0073] of JP2012-063387A, paragraphs [0016] to [0018] of JP1999-305036A (JP-H11-305036A), paragraphs [0009] to [0011] of JP2001-133630A, paragraphs [0030] to [0169] of JP2011-215337A, paragraphs [0021] to [0075] of JP2010-106242A, paragraphs [0011] to [0025] of JP2010-215846A, paragraphs [0017] to [0069] of JP2011-048311A, paragraphs [0033] to [0133] of JP2011-213610A, paragraphs [0074] to [0246] of JP2011-237513A, paragraphs [0005] to [0051] of JP2016-006502A, paragraphs [0005] to [0041] of WO2016/060173A, paragraphs [0008] to [0062] of WO2016/136561A, paragraphs [0014] to [0033] of WO2017/154835A, paragraphs [0014] to [0033] of WO2017/154695A, or paragraphs [0013] to [0037] of WO2017/195833A.

In the invention, two or more kinds of dichroic substances may be used in combination. For example, from the viewpoint of making the optically anisotropic layer closer to black, at least one kind of dichroic substance having a maximum absorption wavelength in a wavelength range of 370 to 550 nm and at least one kind of dichroic substance having a maximum absorption wavelength in a wavelength range of 500 to 700 nm are preferably used in combination.

The optically anisotropic layer forming composition may contain an organic solvent. Examples of the organic solvent include those described in the above description of the photo-alignment film composition of the invention.

The optically anisotropic layer forming composition may contain various alignment agents such as vertical alignment accelerators, e.g., polarizer interface-side vertical alignment agents and air interface-side vertical alignment agents, and horizontal alignment accelerators, e.g., polarizer interface-side horizontal alignment agents and air interface-side horizontal alignment agents.

The optically anisotropic layer forming composition may further contain an adhesion enhancing agent, a plasticizer, a polymer, or the like other than the above-described components.

The method of forming an optically anisotropic layer using an optically anisotropic layer forming composition having the above components is not particularly limited. For example, a coating film may be formed by coating an optically anisotropic layer forming composition on the above-described photo-alignment film according to the embodiment of the invention, and the obtained coating film may be subjected to a curing treatment (irradiation with ultraviolet rays (light irradiation treatment) or heating treatment) to form an optically anisotropic layer.

The coating with the optically anisotropic layer forming composition can be performed by a known method (for example, wire bar coating method, extrusion coating method, direct gravure coating method, reverse gravure coating method, or die coating method).

In the invention, the thickness of the optically anisotropic layer is not particularly limited. The thickness is preferably 0.1 to 10 μm, and more preferably 0.5 to 5 μm.

[Support]

The optical laminate according to the embodiment of the invention may have a support as a base for forming the optically anisotropic layer as described above.

Examples of such a support include a polarizer and a polymer film, and further include a combination thereof, such as a laminate of a polarizer and a polymer film and a laminate of a polymer film, a polarizer, and a polymer film.

The support may be a temporary support which is peelable after formation of the optically anisotropic layer (hereinafter, may be simply referred to as "temporary support"). Specifically, a polymer film functioning as a temporary support may be peeled off from the optical laminate to provide the optically anisotropic layer. For example, an optical laminate including an optically anisotropic layer and a temporary support may be prepared, the optically anisotropic layer side of the optical laminate may be bonded to a support including a polarizer with a pressure sensitive adhesive or an adhesive, and then the temporary support included in the optically anisotropic layer may be peeled off to provide a laminate of the support including a polarizer and the optically anisotropic layer.

<Polarizer>

In the invention, in a case where the optical laminate according to the embodiment of the invention is used in an image display device, at least a polarizer is preferably used as a support.

The polarizer is not particularly limited as long as it is a member functioning to convert light into specific linearly polarized light. An absorption-type polarizer or a reflection-type polarizer which has been known can be used.

As the absorption-type polarizer, an iodine-based polarizer, a dye-based polarizer using a dichroic dye, a polyene-based polarizer, or the like is used. The iodine-based polarizer and the dye-based polarizer include a coating-type polarizer and a stretching-type polarizer, and any of these may be applicable. A polarizer produced by adsorbing iodine or a dichroic dye to polyvinyl alcohol and performing stretching is preferable.

Examples of the method of obtaining a polarizer by performing stretching and dyeing in a state in which a lamination film is obtained by forming a polyvinyl alcohol layer on a base include JP5048120B, JP5143918B, JP4691205B, JP4751481B, and JP4751486B. These known technologies concerning a polarizer can also be preferably used.

As the reflection-type polarizer, a polarizer obtained by laminating thin films having different birefringences, a wire grid-type polarizer, a polarizer obtained by combining a cholesteric liquid crystal having a selective reflection area and a ¼ wavelength plate, or the like is used.

Among these, a polarizer including a polyvinyl alcohol-based resin (that means a polymer including —$CH_2$—CHOH— as a repeating unit. Particularly, at least one selected from the group consisting of polyvinyl alcohol and ethylene-vinyl alcohol copolymer is preferable) is preferable in view of handleability.

In an aspect in which the optical laminate according to the embodiment of the invention includes a peelable support, a polarizing plate can be manufactured as follows.

The support is peeled off from the above-described optical laminate, and a layer including an optically anisotropic layer is laminated on a support including a polarizer. Otherwise, the above-described optical laminate is laminated on a support including a polarizer, and then the peelable support included in the optical laminate is peeled off During the lamination, both layers may be adhered using an adhesive or the like. The adhesive is not particularly limited, and examples thereof include a curable adhesive of an epoxy compound including no aromatic ring in the molecule as shown in JP2004-245925A, an active energy ray-curable adhesive containing, as essential components, a photopolymerization initiator having a molar absorption coefficient of 400 or greater at a wavelength of 360 to 450 nm and an ultraviolet-curable compound as described in JP2008-174667A, and an active energy ray-curable adhesive containing (a) (meth)acrylic compound having two or more (meth)acryloyl groups in the molecule, (b) (meth)acrylic compound having a hydroxyl group in the molecule and having only one polymerizable double bond, and (c) phenol ethylene oxide-modified acrylate or nonyl phenol ethylene oxide-modified acrylate in a total amount of 100 parts by mass of a (meth)acrylic compound as described in JP2008-174667A.

The thickness of the polarizer is not particularly limited. The thickness is preferably 1 to 60 μm, more preferably 1 to 30 μm, and even more preferably 2 to 20 μm.

<Polymer Film>

The polymer film is not particularly limited, and a polymer film which is generally used (for example, polarizer protective film) can be used.

Specific examples of the polymer constituting the polymer film include cellulose-based polymers; acrylic polymers having an acrylic ester polymer such as polymethyl methacrylate and a lactone ring-containing polymer; thermoplastic norbornene-based polymers; polycarbonate-based polymers; polyester-based polymers such as polyethylene terephthalate and polyethylene naphthalate; styrene-based polymers such as polystyrene and an acrylonitrile-styrene copolymer (AS resin); polyolefin-based polymers such as polyethylene, polypropylene, and an ethylene-propylene copolymer; vinyl chloride-based polymers; amide-based polymers such as nylon and aromatic polyamide; imide-based polymers; sulfone-based polymers; polyether sulfone-based polymers; polyether ether ketone-based polymers; polyphenylene sulfide-based polymers; vinylidene chloride-based polymers; vinyl alcohol-based polymers; vinyl butyral-based polymers; arylate-based polymers; polyoxymethylene-based polymers; epoxy-based polymers; and polymers obtained by mixing these polymers.

Among these, cellulose-based polymers (hereinafter, also referred to as "cellulose acylate") represented by triacetyl cellulose can be preferably used.

From the viewpoint of workability and optical performance, acrylic polymers are also preferably used.

Examples of the acrylic polymers include polymethyl methacrylate and lactone ring-containing polymers described in paragraphs [0017] to [0107] of JP2009-098605A.

The thickness of the polymer film which is used as a polarizer protective film or the like is not particularly limited, and preferably 40 μm or less since the thickness of the optical laminate can be reduced. The lower limit is not particularly limited, and generally 5 μm or greater.

In the invention, the thickness of the support is not particularly limited. The thickness is preferably 1 to 100 μm, more preferably 5 to 50 μm, and even more preferably 5 to 20 μm. In a case where the polarizer and the polymer film are all included, the thickness of the support refers to a total of thicknesses of the polarizer and the polymer film.

In an aspect in which a polymer film is used as the support which is peelable from the optical laminate, a cellulose-based polymer or a polyester-based polymer can be preferably used. The thickness of the polymer film is not particularly limited. The thickness is preferably 5 μm to 100 μm, and more preferably 20 μm to 90 μm due to handling during the manufacturing. The interface where peeling is performed may be between the support and the photo-alignment film or between the photo-alignment film and the optically anisotropic layer. The peeling may be performed at another interface.

[Image Display Device]

Since the optical laminate according to the embodiment of the invention can be reduced in thickness by peeling off the support, it can be used suitably in the production of an image display device.

The display element which is used in the image display device is not particularly limited, and examples thereof include a liquid crystal cell, an organic electroluminescence (hereinafter, electroluminescence "EL") display panel, and a plasma display panel.

Among these, a liquid crystal cell or an organic EL display panel is preferable, and a liquid crystal cell is more preferable. That is, the image display device is preferably a liquid crystal display device using a liquid crystal cell as a display element or an organic EL display device using an organic EL display panel as a display element, and more preferably a liquid crystal display device.

[Liquid Crystal Display Device]

A liquid crystal display device as an example of the image display device is a liquid crystal display device having the above-described optical laminate according to the embodiment of the invention and a liquid crystal cell.

In the invention, the optical laminate according to the embodiment of the invention is preferably used as a front-side polarizing plate among polarizing plates provided on both sides of the liquid crystal cell.

Hereinafter, the liquid crystal cell constituting the liquid crystal display device will be described in detail.

<Liquid Crystal Cell>

The liquid crystal cell which is used in the liquid crystal display device is preferably a vertical alignment (VA) mode, an optically compensated bend (OCB) mode, an in-plane-switching (IPS) mode, or a twisted nematic (TN) mode, but is not limited thereto.

In a TN mode liquid crystal cell, rod-like liquid crystalline molecules (rod-like liquid crystal compound) are substantially horizontally aligned with no voltage application thereto, and subjected to twist alignment of 60° to 120°. The TN mode liquid crystal cell is the most frequently used as a color TFT liquid crystal display device, and there are descriptions in many literatures.

In a VA mode liquid crystal cell, rod-like liquid crystalline molecules are substantially vertically aligned with no voltage application thereto. The VA mode liquid crystal cell may be any one of (1) a VA mode liquid crystal cell in the narrow sense in which rod-like liquid crystalline molecules are substantially vertically aligned with no voltage application thereto, but are substantially horizontally aligned in the presence of voltage application thereto (described in JP1990-176625A (JP-H2-176625A)); (2) a (multi-domain vertical alignment (MVA) mode) liquid crystal cell attaining multi-domain of the VA mode for view angle enlargement (described in SID97, Digest of tech. Papers (proceedings) 28 (1997), 845), (3) an (n-axially symmetric aligned microcell (ASM) mode) liquid crystal cell in which rod-like liquid crystalline molecules are substantially vertically aligned with no voltage application thereto, but are subjected to twist multi-domain alignment in the presence of voltage application thereto (described in proceedings of Japan Liquid Crystal Debating Society, 58 to 59 (1998)), and (4) a super ranged viewing by vertical alignment (SURVIVAL) mode liquid crystal cell (published in liquid crystal display (LCD) International 98). In addition, the VA mode liquid crystal cell may be any one of a patterned vertical alignment (PVA) type, an optical alignment type, and a polymer-sustained alignment (PSA) type. The details of the modes are described in JP2006-215326A and JP2008-538819A.

In an IPS mode liquid crystal cell, rod-like liquid crystalline molecules are aligned to be substantially parallel to the substrate. The liquid crystalline molecules planarly respond by the application of an electric field parallel to a substrate surface. In the IPS mode, black display is performed during application of no electric field, and the absorption axes of a pair of upper and lower polarizing plates are perpendicular to each other. A method of improving a view angle by reducing light leakage at the time of black display in an oblique direction by using an optical compensation sheet is disclosed in JP1998-054982A (JP-H10-054982A), JP1999-202323A (JP-H11-202323A), JP1997-292522A (JP-H09-292522A), JP1999-133408A (JP-H11-133408A), JP1999-305217A (JP-H11-305217A), JP1998-307291A (JP-H10-307291A), and the like.

EXAMPLES

Hereinafter, the invention will be more specifically described based on examples. Materials, used amounts, ratios, treatment contents, treatment procedures, and the like of the following examples are able to be suitably changed unless the changes cause deviance from the gist of the invention. Therefore, the range of the invention will not be restrictively interpreted by the following examples.

[Synthesis of Monomer mA-7]

50.0 g of 4-aminocyclohexanol, 48.3 g of triethylamine, and 800 g of N,N-dimethylacetamide were weighed out into a 2 L three-neck flask comprising a stirring blade, a thermometer, a dropping funnel, and a reflux pipe, and stirred under ice cooling.

Next, 47.5 g of methacrylic acid chloride was added dropwise using the dropping funnel for 40 minutes, and after completion of the dropwise addition, the mixture was stirred at 40° C. for 2 hours.

The reaction liquid was cooled to room temperature (23° C.), and then the precipitated salt was removed by suction filtration. The obtained organic layer was transferred to a 2 L three-neck flask comprising a stirring blade, a thermometer, a dropping funnel, and a reflux pipe, and stirred under water cooling.

Next, 10.6 g of N,N-dimethylaminopyridine and 65.9 g of triethylamine were added, and 127.9 g of 4-methoxycinnamic acid chloride dissolved previously in 125 g of tetrahydrofuran was added dropwise using the dropping funnel for 30 minutes. After completion of the dropwise addition, the mixture was stirred at 50° C. for 6 hours. The reaction liquid was cooled to room temperature, and then subjected to liquid separation and washed with water. The obtained organic layer was dried by anhydrous magnesium sulfate and concentrated, and thus a yellowish white solid was obtained.

The obtained yellowish white solid was dissolved in 400 g of methyl ethyl ketone by heating and recrystallized to obtain 76 g of a monomer mA-7 shown below as a white solid (yield 40%).

The following monomer mA-7 corresponds to a monomer forming the above-described repeating unit A-7.

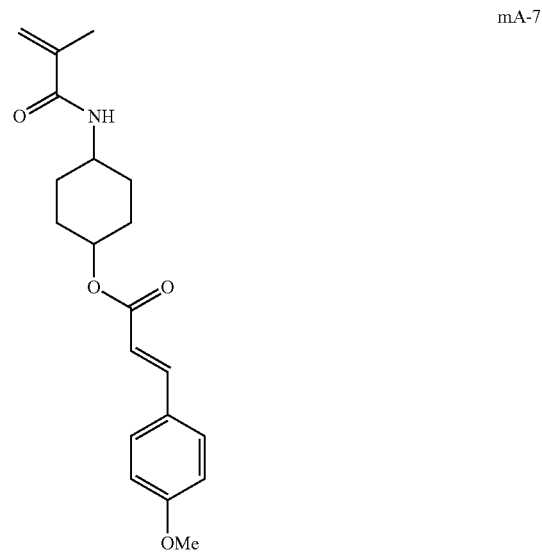

mA-7

[Synthesis of Monomer mA-8, Etc.]

The following monomers mA-8, mA-9, mA-10, MA-12, mA-14, mA-20, mA-21, mA-43, and mA-44 were synthesized in the same manner as in the case of the monomer mA-7, except that 4-aminocyclohexanol as a raw material was changed to corresponding amino alcohol and corresponding cinnamic acid chloride.

The following monomers mA-8 and the like respectively correspond to monomers forming the above-described repeating units A-8 and the like.

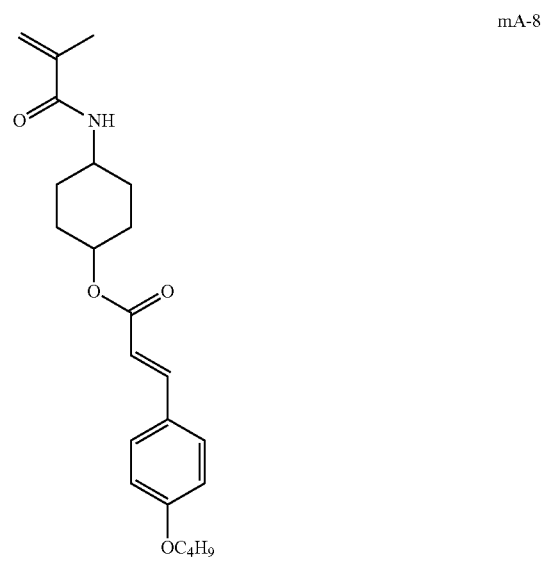

mA-8 mA-9
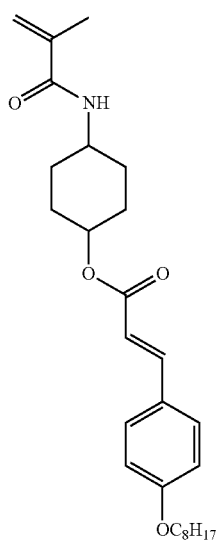
mA-14
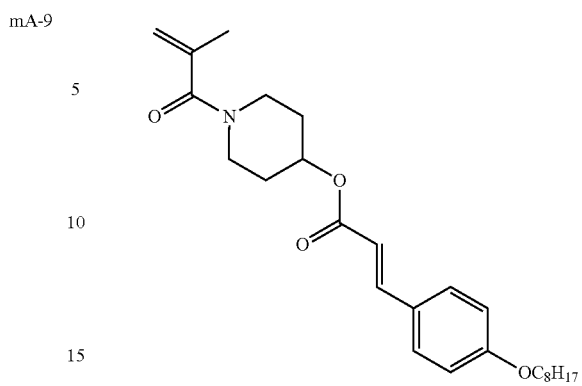
mA-10
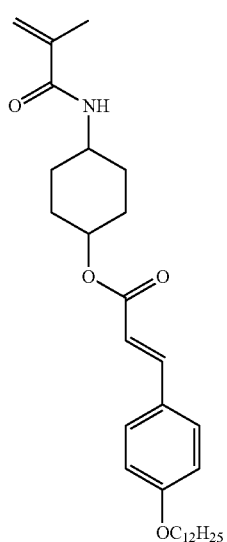
mA-20
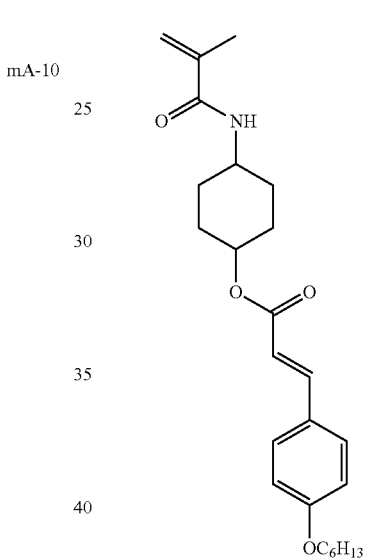
mA-12
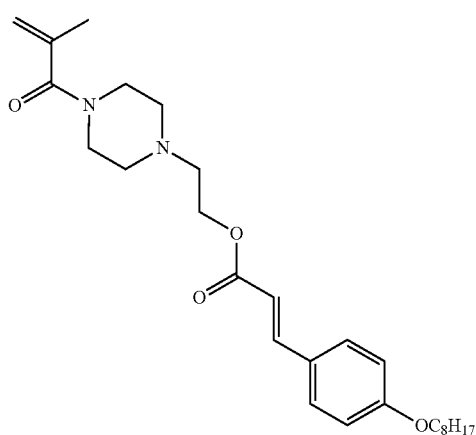
mA-21
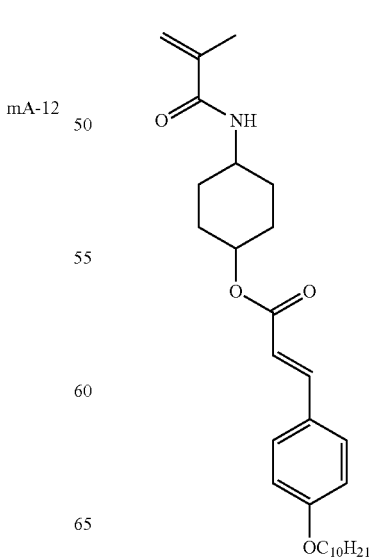

-continued mA-43

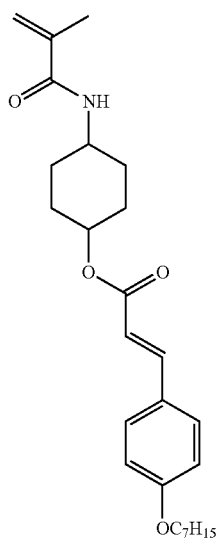

mA-44

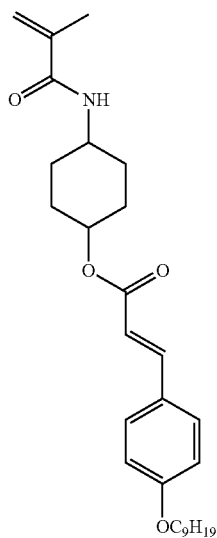

[Synthesis of Monomer mA-2]
<Synthesis of mA-2 Intermediate>

12.3 g of 1,4-cyclohexanediamine, 24.7 g of 1-(3-dimethylaminopropyl)-3-ethylcarbodiimide hydrochloride, 5.4 g of triethylamine, 6.57 g of N,N-dimethyl-4-aminopyridine, and 140 mL of methylene chloride were put into a 300 mL three-neck flask comprising a stirring blade, a thermometer, a dropping funnel, and a reflux pipe, and stirred at room temperature (23° C.).

Next, 11.1 g of a methacrylic acid was added dropwise using the dropping funnel at room temperature for 30 minutes, and after completion of the dropwise addition, the mixture was stirred at 50° C. for 5 hours.

The reaction liquid was cooled to room temperature, and then subjected to liquid separation and washed with water. The obtained organic layer was dried by anhydrous magnesium sulfate and concentrated, and thus a pale yellow solid was obtained.

The obtained pale yellow solid was purified with a silica gel column (developing solvent, hexane/ethyl acetate=2/1), and thus 14.0 g of 4-methacrylamino cyclohexylamine as a target mA-2 intermediate (yield 70%) was obtained as an amorphous solid.

<Synthesis of Monomer mA-2>

The following monomer mA-2 was synthesized in the same manner as in the case of the monomer mA-7, except that 2-hydroxyethyl methacrylate (HEMA) as a raw material was changed to the mA-2 intermediate (4-methacrylamino cyclohexylamine) and the cinnamic acid chloride was changed to a corresponding cinnamic acid chloride derivative.

The following monomer mA-2 corresponds to a monomer forming the above-described repeating unit A-2.

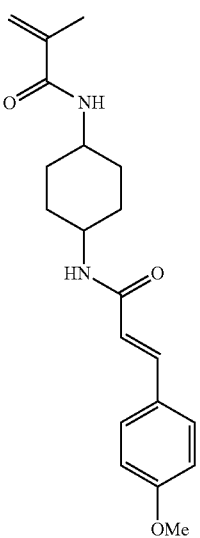

mA-2

[Synthesis of Monomer mA-16, Etc.]

The following monomers mA-16, mA-18, and mA-19 were synthesized in the same manner as in the case of the monomer mA-2, except that 1,4-cyclohexanediamine as a raw material was changed to corresponding diamine and corresponding cinnamic acid chloride.

The following monomers mA-16 and the like respectively correspond to monomers forming the above-described repeating units A-16 and the like.

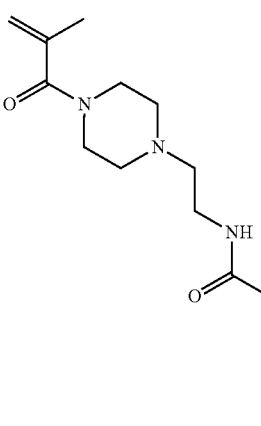
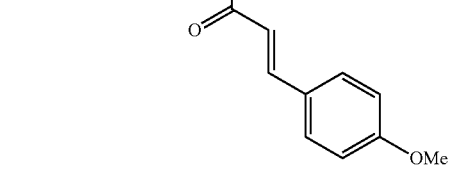

mA-16

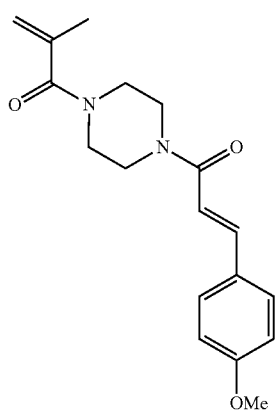

mA-18

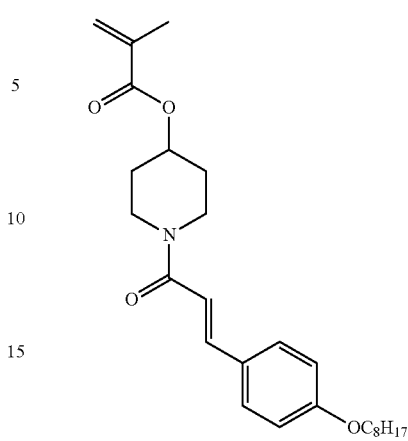

mA-38 mA-19

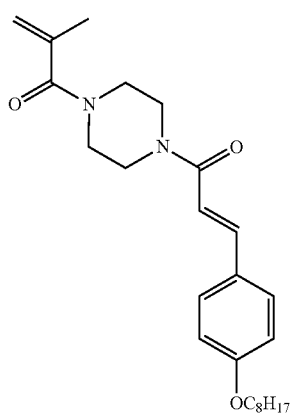

[Synthesis of Monomer mH-1]

The following monomer mH-1 was synthesized using 2-hydroxyethyl methacrylate (HEMA) (TOKYO CHEMICAL INDUSTRY CO., LTD.) and cinnamic acid chloride (TOKYO CHEMICAL INDUSTRY CO., LTD.) according to a method described in Langmuir, 32 (36), 9245-9253 (2016).

The following monomer mH-1 corresponds to a monomer forming a repeating unit H-1 shown below.

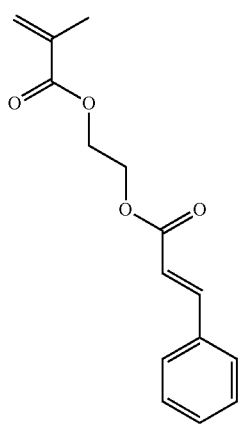

mH-1

[Synthesis of Monomer mA-38]

43.9 g of 4-hydroxypiperidine, 48.3 g of triethylamine, and 800 g of N,N-dimethylacetamide were weighed out into a 2 L three-neck flask comprising a stirring blade, a thermometer, a dropping funnel, and a reflux pipe, and stirred under ice cooling.

Next, 134.4 g of 4-octyloxycinnamic acid chloride dissolved previously in 150 g of tetrahydrofuran was added dropwise using the dropping funnel for 30 minutes. After completion of the dropwise addition, the mixture was stirred at 40° C. for 1 hour.

The reaction liquid was cooled to room temperature (23° C.), and then the precipitated salt was removed by suction filtration. The obtained organic layer was transferred to a 2 L three-neck flask comprising a stirring blade, a thermometer, a dropping funnel, and a reflux pipe, and stirred under water cooling.

Next, 10.6 g of N,N-dimethylaminopyridine and 65.9 g of triethylamine were added, and 47.5 g of methacrylic acid chloride was added dropwise using the dropping funnel for 30 minutes. After completion of the dropwise addition, the mixture was stirred at 40° C. for 1 hour. The reaction liquid was cooled to room temperature, and then subjected to liquid separation and washed with water. The obtained organic layer was dried by anhydrous magnesium sulfate and concentrated, and thus a yellowish white solid was obtained.

The obtained yellowish white solid was dissolved in 400 g of methanol by heating and recrystallized to obtain 92 g of a monomer mA-8 shown below as a white solid (yield 50%).

The following monomer mA-38 corresponds to a monomer forming the above-described repeating unit A-38.

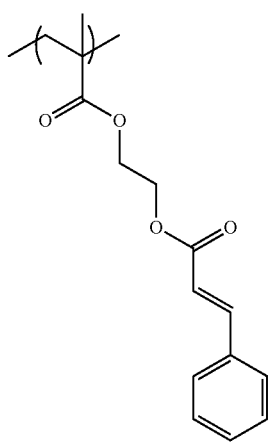

H-1

[Synthesis of Monomer mH-2]

The following monomer mH-2 was synthesized in the same manner as in the case of the monomer mH-1, except that 2-hydroxyethyl methacrylate (HEMA) as a raw material was changed to 2-hydroxyethyl acrylamide (TOKYO CHEMICAL INDUSTRY CO., LTD.) and a corresponding cinnamic acid chloride derivative.

The following monomer mH-2 corresponds to a monomer forming the following repeating unit H-2.

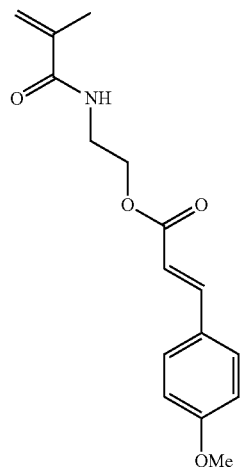

mH-2

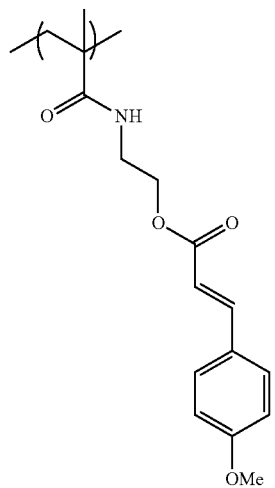

H-2

[Synthesis of Monomer mB-18]

The following monomer mB-18 was synthesized in the same manner as in the case of the monomer mH-1, except that the cinnamic acid chloride as a raw material was changed to 3-chloropropionyl chloride (TOKYO CHEMICAL INDUSTRY CO., LTD.). The following monomer mB-18 corresponds to a monomer forming a precursor of the above-described repeating unit B-18 (that is, a unit before being changed into an acryloyl group by deprotection).

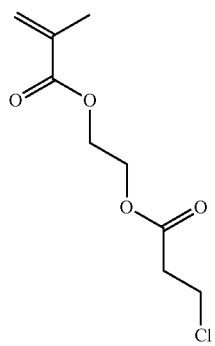

mB-18

[Other Monomers]

Commercially available glycidyl methacrylate (TOKYO CHEMICAL INDUSTRY CO., LTD.) was used as the following monomer mB-1 forming the above-described repeating unit B-1, CYCLOMER M-100 (manufactured by Daicel Corporation) was used as the following monomer mB-2 forming the above-described repeating unit B-2, and OXE-30 (manufactured by OSAKA ORGANIC CHEMICAL INDUSTRY LTD.) was used as the following monomer mB-3 forming the above-described repeating unit B-3.

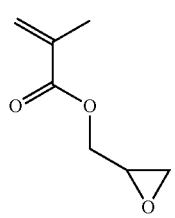

mB-1

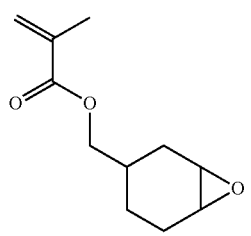

mB-2

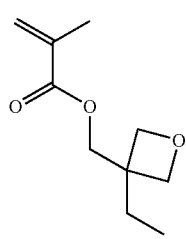

mB-3

Example 1

5 parts by mass of 2-butanone as a solvent was put into a flask comprising a cooling pipe, a thermometer, and a stirrer, and refluxing was performed by heating in a water bath with nitrogen flowing into the flask at 5 mL/min. Here, a solution obtained by mixing 5 parts by mass of the monomer mA-2, 5 parts by mass of the monomer mB-15, 1 part by mass of 2,2'-azobis(isobutyronitrile) as a polymerization initiator, and 5 parts by mass of 2-butanone as a solvent was added dropwise thereto for 3 hours, and the mixture was stirred while maintaining the refluxing state for 3 hours. After completion of the reaction, the reaction mixture was allowed to cool to room temperature, and 30 parts by mass of 2-butanone was added and diluted to obtain about 20 mass % of a polymer solution. The obtained polymer solution was poured into a large excess of methanol to precipitate the polymer, and the collected precipitate was separated by filtering and washed with a large amount of methanol. Then, the resulting material was subjected to blast drying at 50° C. for 12 hours, and thus a polymer P-1 having a photoalignment group was obtained.

Examples 2 to 34 and Comparative Examples 1 to 4

Polymers were synthesized in the same manner as in the case of the polymer P-1 synthesized in Example 1, except that the synthesized monomers were respectively used as monomers forming the repeating units shown in the following Table 3, and the amount of the polymerization initiator to be added was changed such that the weight-average molecular weights were provided as shown in the following Table 3.

Example 35

5 parts by mass of 2-butanone as a solvent was put into a flask comprising a cooling pipe, a thermometer, and a stirrer, and refluxing was performed by heating in a water bath with nitrogen flowing into the flask at 5 mL/min. Here, a solution obtained by mixing 10 parts by mass of the monomer mA-9, 75 parts by mass of the monomer mB-2, 15 parts by mass of the monomer mB-18, 0.8 parts by mass of 2,2'-azobis (isobutyronitrile) as a polymerization initiator, and 5 parts by mass of 2-butanone as a solvent was added dropwise thereto for 3 hours, and the mixture was stirred while maintaining the refluxing state for 12 hours. Then, the mixture was cooled to 60° C., and 0.01 parts by mass of 4-methoxyphenol and 15 parts by mass of diazabicycloundecene were added thereto. The mixture was further reacted at 60° C. for 6 hours. After completion of the reaction, the reaction mixture was allowed to cool to room temperature, and 30 parts by mass of 2-butanone was added and diluted to obtain about 20 mass % of a polymer solution. The obtained polymer solution was poured into a large excess of methanol to precipitate the polymer, and the collected precipitate was separated by filtering and washed with a large amount of methanol. Then, the resulting material was subjected to blast drying at 50° C. for 12 hours, and thus a polymer P-35 was obtained.

Example 36

5 parts by mass of 2-butanone as a solvent was put into a flask comprising a cooling pipe, a thermometer, and a stirrer, and refluxing was performed by heating in a water bath with nitrogen flowing into the flask at 5 mL/min. Here, a solution obtained by mixing 10 parts by mass of the monomer mA-9, 75 parts by mass of the monomer mB-2, 15 parts by mass of 2-hydroxyethyl methacrylate (HEMA) (TOKYO CHEMICAL INDUSTRY CO., LTD.), 0.8 parts by mass of 2,2'-azobis(isobutyronitrile) as a polymerization initiator, and 5 parts by mass of 2-butanone as a solvent was added dropwise thereto for 3 hours, and the mixture was stirred while maintaining the refluxing state for 3 hours. Then, the mixture was cooled to room temperature, 20 parts by mass of Karenz MOI (manufactured by SHOWA DENKO K.K.) and 0.1 parts by mass of Neostann U-830 (manufactured by NITTO KASEI CO., LTD.) were added, and the mixture was further reacted at room temperature for 4 hours. After completion of the reaction, the reaction mixture was allowed to cool to room temperature, and 30 parts by mass of 2-butanone was added and diluted to obtain about 20 mass % of a polymer solution. The obtained polymer solution was poured into a large excess of methanol to precipitate the polymer, and the collected precipitate was separated by filtering and washed with a large amount of methanol. Then, the resulting material was subjected to blast drying at 50° C. for 12 hours, and thus a polymer P-36 was obtained.

Examples 37 to 47

Polymers P-37 to P-47 were synthesized in the same manner as in the case of the polymer P-35 described in Example 35, except that the monomer mB-18 as a raw material was changed to 2-(2-bromoisobutyryloxy)ethyl methacrylate and the amount thereof was changed to an amount corresponding to the content of the repeating unit B2 shown in the following Table 3.

The weight-average molecular weight of each of the synthesized polymers was measured by the above-described method. The results are shown in the following Table 3.

TABLE 3

| | | Repeating Unit | | | Content * | | Weight- |
| | | Repeating Unit A and the like | Repeating Unit B1 | Repeating Unit B2 | a/(a + b1 + b2) | b2/(a + b1 + b2) | Average Molecular Weight |
| --- | --- | --- | --- | --- | --- | --- | --- |
| | Polymer | | | | | | |
| Example 1 | P-1 | A-2 | B-15 | — | 0.5 | 0 | 28000 |
| Example 2 | P-2 | A-2 | B-1 | — | 0.5 | 0 | 28000 |
| Example 3 | P-3 | A-2 | B-2 | — | 0.5 | 0 | 32000 |
| Example 4 | P-4 | A-2 | B-3 | — | 0.5 | 0 | 32000 |
| Example 5 | P-5 | A-7 | B-1 | — | 0.5 | 0 | 31000 |
| Example 6 | P-6 | A-7 | B-2 | — | 0.5 | 0 | 38000 |
| Example 7 | P-7 | A-7 | B-3 | — | 0.5 | 0 | 34000 |
| Example 8 | P-8 | A-7 | B-2 | — | 0.3 | 0 | 35000 |
| Example 9 | P-9 | A-7 | B-2 | — | 0.7 | 0 | 34000 |
| Example 10 | P-10 | A-8 | B-2 | — | 0.5 | 0 | 42000 |

TABLE 3-continued

|  | Polymer | Repeating Unit A and the like | Repeating Unit B1 | Repeating Unit B2 | a/(a + b1 + b2) | b2/(a + b1 + b2) | Weight-Average Molecular Weight |
|---|---|---|---|---|---|---|---|
| Example 11 | P-11 | A-9 | B-2 | — | 0.5 | 0 | 60000 |
| Example 12 | P-12 | A-10 | B-2 | — | 0.5 | 0 | 58000 |
| Example 13 | P-13 | A-16 | B-2 | — | 0.3 | 0 | 45000 |
| Example 14 | P-14 | A-16 | B-2 | — | 0.5 | 0 | 44000 |
| Example 15 | P-15 | A-16 | B-2 | — | 0.03 | 0 | 40000 |
| Example 16 | P-16 | A-19 | B-2 | — | 0.03 | 0 | 40000 |
| Example 17 | P-17 | A-12 | B-2 | — | 0.03 | 0 | 40000 |
| Example 18 | P-18 | A-14 | B-2 | — | 0.5 | 0 | 38000 |
| Example 19 | P-19 | A-9 | B-2 | — | 0.3 | 0 | 50000 |
| Example 20 | P-20 | A-14 | B-2 | — | 0.3 | 0 | 49000 |
| Example 21 | P-21 | A-9 | B-2 | — | 0.2 | 0 | 48000 |
| Example 22 | P-22 | A-14 | B-2 | — | 0.2 | 0 | 48000 |
| Example 23 | P-23 | A-9 | B-2 | — | 0.15 | 0 | 40000 |
| Example 24 | P-24 | A-9 | B-2 | — | 0.12 | 0 | 42000 |
| Example 25 | P-25 | A-9 | B-2 | — | 0.09 | 0 | 44000 |
| Example 26 | P-26 | A-9 | B-2 | — | 0.05 | 0 | 48000 |
| Example 27 | P-27 | A-9 | B-2 | — | 0.03 | 0 | 53000 |
| Example 28 | P-28 | A-14 | B-2 | — | 0.05 | 0 | 52000 |
| Example 29 | P-29 | A-20 | B-2 | — | 0.12 | 0 | 44000 |
| Example 30 | P-30 | A-43 | B-2 | — | 0.12 | 0 | 45000 |
| Example 31 | P-31 | A-44 | B-2 | — | 0.12 | 0 | 48000 |
| Example 32 | P-32 | A-21 | B-2 | — | 0.12 | 0 | 43000 |
| Example 33 | P-33 | A-9 | B-3 | — | 0.12 | 0 | 42000 |
| Example 34 | P-34 | A-38 | B-2 | — | 0.15 | 0 | 82000 |
| Example 35 | P-35 | A-9 | B-2 | B-18 | 0.1 | 0.15 | 40000 |
| Example 36 | P-36 | A-9 | B-2 | B-19 | 0.1 | 0.15 | 41000 |
| Example 37 | P-37 | A-9 | B-2 | B-23 | 0.1 | 0.15 | 40000 |
| Example 38 | P-38 | A-9 | B-2 | B-23 | 0.1 | 0.06 | 40000 |
| Example 39 | P-39 | A-9 | B-2 | B-23 | 0.1 | 0.25 | 40000 |
| Example 40 | P-40 | A-9 | B-2 | B-23 | 0.1 | 0.4 | 40000 |
| Example 41 | P-41 | A-9 | B-2 | B-23 | 0.1 | 0.55 | 40000 |
| Example 42 | P-42 | A-9 | B-18 | — | 0.14 | 0 | 48000 |
| Example 43 | P-43 | A-9 | B-19 | — | 0.18 | 0 | 37000 |
| Example 44 | P-44 | A-9 | B-23 | — | 0.15 | 0 | 130000 |
| Example 45 | P-45 | A-9 | B-24 | — | 0.16 | 0 | 160000 |
| Example 46 | P-46 | A-9 | B-18 | — | 0.09 | 0 | 58000 |
| Example 47 | P-47 | A-9 | B-18 | — | 0.22 | 0 | 54000 |
| Comparative Example 1 | HP-1 | A-18 | — | — | 1 | 0 | 35000 |
| Comparative Example 2 | HP-2 | A-19 | — | — | 1 | 0 | 35000 |
| Comparative Example 3 | HP-3 | H-2 | B-1 | — | 0.5 | 0 | 35000 |
| Comparative Example 4 | HP-4 | H-1 | B-1 | — | 0.5 | 0 | 30000 |

\* A content of the repeating unit shown in the column of "Repeating Unit A and the like" is represented by a, a content of the repeating unit shown in the column of "Repeating Unit B1" is represented by b1, and a content of the repeating unit shown in the column of "Repeating Unit B2" is represented by b2.

Next, the polymers synthesized in Examples 1 to 4, 6, 8, 10, 13, 14, 16, 19 to 42, and 47 and Comparative Examples 1 to 4 were evaluated as follows.

[Preparation of Photo-Alignment Film Composition]

8.8 parts by mass of the polymer P-1 synthesized in Example 1 and 0.07 parts by mass of a thermal acid generator represented by the following structural formula were added with respect to butyl acetate/methyl ethyl ketone (80 parts by mass/20 parts by mass), and a photo-alignment film composition was prepared.

In the same manner, photo-alignment film compositions were respectively prepared in which 8.8 parts by mass of each of the polymers synthesized in other examples and comparative examples was added with respect to butyl acetate/methyl ethyl ketone (80 parts by mass/20 parts by mass).

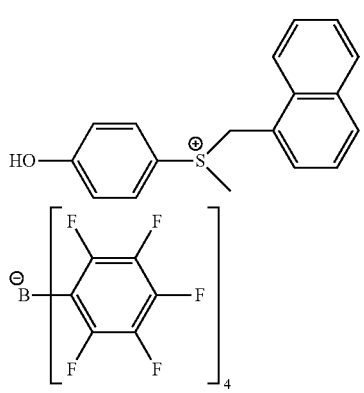

[Production of Optical Laminate]

As a cellulose acylate film, the same one as Comparative Example 1 of JP2014-164169A was used.

Each photo-alignment film composition prepared previously was coated on one surface of the film by a bar coater. After the coating, the solvent was removed by drying for 5 minutes on a hot plate at 80° C. to form a photo-isomerization composition layer having a thickness of 0.2 μm. The obtained photo-isomerization composition layer was irradiated with polarized ultraviolet light (10 mJ/cm$^2$, using an extra-high-pressure mercury lamp) to form a photo-alignment film.

Next, a nematic liquid crystal compound (ZLI-4792, manufactured by Merck KGaA) was coated on the photo-alignment film by a bar coater to form a composition layer. The formed composition layer was heated to 90° C. on a hot plate, and then cooled to 60° C. to stabilize the alignment.

Then, the temperature was kept at 60° C., and the alignment was fixed by ultraviolet irradiation (500 mJ/cm$^2$, using an extra-high-pressure mercury lamp) under a nitrogen atmosphere (with an oxygen concentration of 100 ppm). An optically anisotropic layer having a thickness of 2.0 μm was formed, and an optical laminate was produced.

Example 48

An optical laminate was produced in the same manner as in Example 24, except that the following optically anisotropic layer coating liquid (liquid crystal 101) was used in place of the nematic liquid crystal compound coated on the photo-alignment film. The optical laminate was used as an optical laminate of Example 48.

Example 49

An optical laminate was produced in the same manner as in Example 24, except that the following optically anisotropic layer coating liquid (liquid crystal 102) was used in place of the nematic liquid crystal compound coated on the photo-alignment film to fix the alignment of the liquid crystal compound by the following producing method. The optical laminate was used as an optical laminate of Example 49.

| Optically Anisotropic Layer Coating Liquid (liquid crystal 102) | |
|---|---|
| Following Liquid Crystal Compound L-3 | 42.00 parts by mass |
| Following Liquid Crystal Compound L-4 | 42.00 parts by mass |
| Following Polymerizable Compound A-1 | 16.00 parts by mass |
| Following Polymerization Initiator S-1 (oxime type) | 0.50 parts by mass |
| Leveling Agent (compound G-1 described above) | 0.20 parts by mass |
| HISOLVE MTEM (manufactured by TOHO Chemical Industry Co., Ltd.) | 2.00 parts by mass |
| NK Ester A-200 (manufactured by SHIN-NAKAMURA CHEMICAL CO, LTD.) | 1.00 part by mass |
| Methyl Ethyl Ketone | 424.8 parts by mass |

The group adjacent to the acryloyloxy group of the following liquid crystal compounds L-3 and L-4 represents a propylene group (group in which a methyl group was substituted with an ethylene group). Each of the following liquid crystal compounds L-3 and L-4 represents a mixture of regioisomers with different methyl group positions.

| Optically Anisotropic Layer Coating Liquid (liquid crystal 101) | |
|---|---|
| Following Liquid Crystal Compound L-1 | 80.00 parts by mass |
| Following Liquid Crystal Compound L-2 | 20.00 parts by mass |
| Polymerization Initiator (IRGACURE 184, manufactured by BASF SE) mass | 3.00 parts by mass |
| Polymerization Initiator (IRGACURE OXE-01, manufactured by BASF SE) | 3.00 parts by mass |
| Leveling Agent (following compound G-1) | 0.20 parts by mass |
| Methyl Ethyl Ketone | 424.8 parts by mass |

L-1

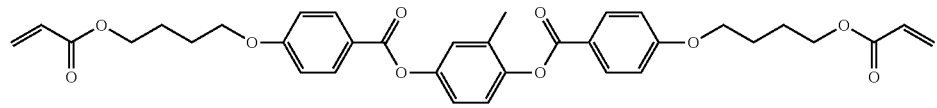 [SMILES: C=CC(=O)OCCCCOc1ccc(C(=O)Oc2ccc(OC(=O)c3ccc(OCCCCOC(=O)C=C)cc3)c(C)c2)cc1]

L-2

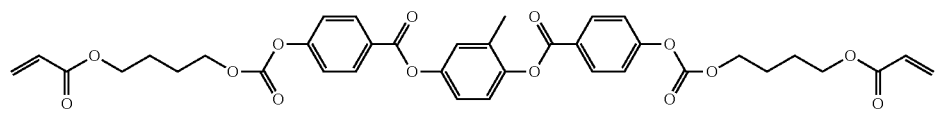 [SMILES: C=CC(=O)OCCCCOC(=O)Oc1ccc(C(=O)Oc2ccc(OC(=O)c3ccc(OC(=O)OCCCCOC(=O)C=C)cc3)c(C)c2)cc1]

G-1

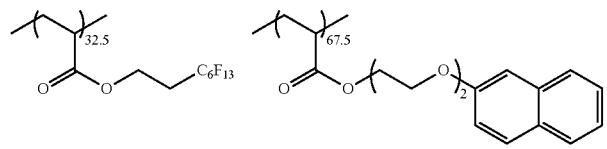

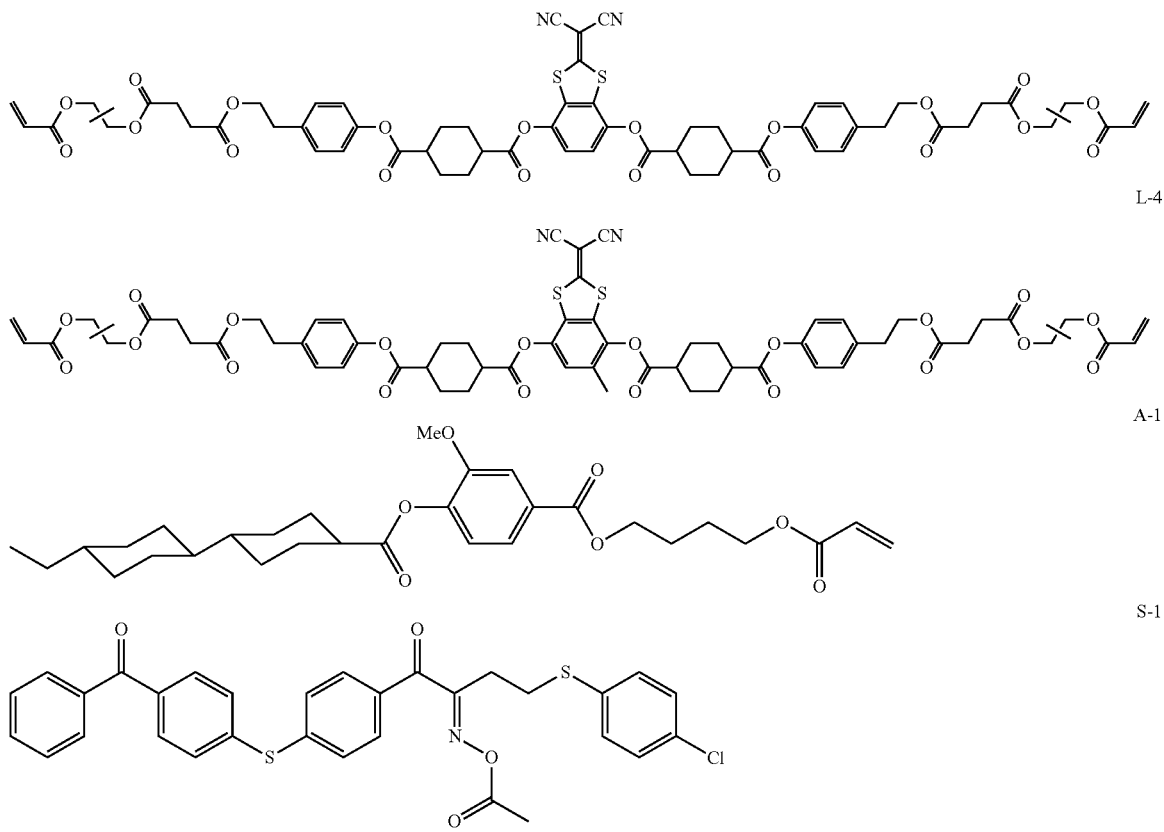

L-3

L-4

A-1

S-1

[Producing Method]

The liquid crystal 102 was coated on the photo-alignment surface using a bar coater. The coating film formed on the alignment film was heated to 120° C. by warm air, and then cooled to 60° C. Then, 10 mJ/cm² of ultraviolet light was applied to the coating film at a wavelength of 365 nm using a high-pressure mercury lamp under a nitrogen atmosphere. The coating film was then irradiated with 500 mJ/cm² of ultraviolet light while being heated to 120° C. to fix the alignment of the liquid crystal compound, and an optical laminate of Example 49 was produced.

Example 50

An optical laminate was produced in the same manner as in Example 24, except that the following optically anisotropic layer coating liquid (liquid crystal 103) was used in place of the nematic liquid crystal compound coated on the photo-alignment film. The optical laminate was used as an optical laminate of Example 50.

| Optically Anisotropic Layer Coating Liquid (liquid crystal 103) | |
|---|---|
| Following Liquid Crystal Compound L-5 | 42.00 parts by mass |
| Following Liquid Crystal Compound L-6 | 42.00 parts by mass |
| Above-Described Polymerizable Compound A-1 | 16.00 parts by mass |
| Above-Described Polymerization Initiator S-1 (oxime type) | 0.50 parts by mass |
| Leveling Agent (compound G-1 described above) | 0.20 parts by mass |
| HISOLVE MTEM (manufactured by TOHO Chemical Industry Co., Ltd.) | 2.00 parts by mass |
| NK Ester A-200 (manufactured by SHIN-NAKAMURA CHEMICAL CO, LTD.) | 1.00 part by mass |
| Methyl Ethyl Ketone | 424.8 parts by mass |

L-5

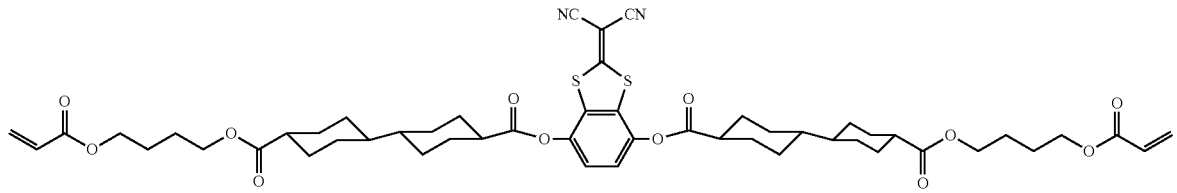 [SMILES: C=CC(=O)OCCCCOC(=O)C1CCC(C2CCC(C(=O)Oc3ccc(OC(=O)C4CCC(C5CCC(C(=O)OCCCCOC(=O)C=C)CC5)CC4)c4c3SC(=C(C#N)C#N)S4)CC2)CC1]

-continued

Optically Anisotropic Layer Coating Liquid (liquid crystal 103)

L-6

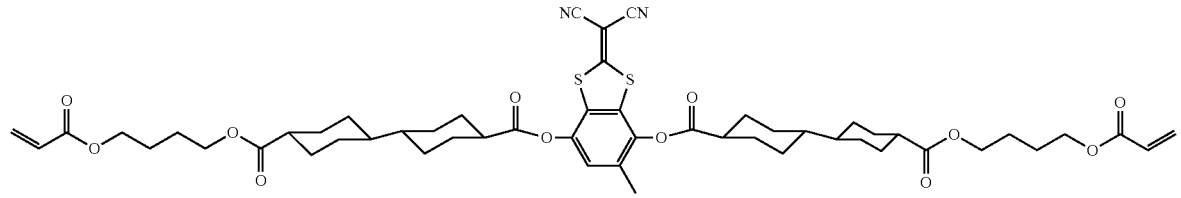 [SMILES: C=CC(=O)OCCCCOC(=O)C1CCC(C2CCC(C(=O)Oc3cc(C)c(OC(=O)C4CCC(C5CCC(C(=O)OCCCCOC(=O)C=C)CC5)CC4)c4c3SC(=C(C#N)C#N)S4)CC2)CC1]

Example 51

An optical laminate was produced in the same manner as in Example 39, except that the following optically anisotropic layer coating liquid (liquid crystal 104) was used in place of the nematic liquid crystal compound coated on the photo-alignment film. The optical laminate was used as an optical laminate of Example 51.

| Optically Anisotropic Layer Coating Liquid (liquid crystal 104) | |
|---|---|
| Following Polymer Liquid Crystal Compound L-7 | 4.032 parts by mass |
| Following Interface Improver F1 | 0.039 parts by mass |
| Polymerization Initiator IRGACURE 819 (manufactured by BASF SE) | 0.043 parts by mass |
| Cyclopentanone | 66.500 parts by mass |
| Tetrahydrofuran | 28.500 parts by mass |

L-7

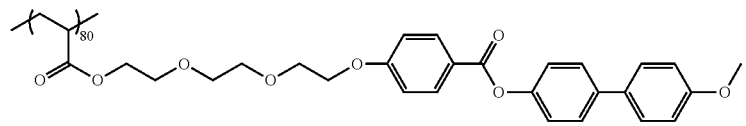

L-8

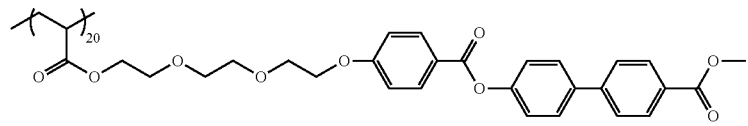

F-1

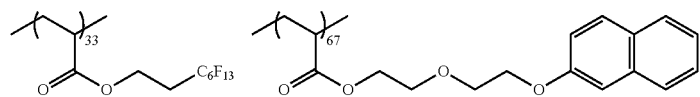

Example 52

An optical laminate was produced in the same manner as in Example 50, except that 0.26 parts by mass of a thermal acid generator represented by the following structural formula was added in the preparation of the photo-alignment film composition. The optical laminate was used as an optical laminate of Example 52.

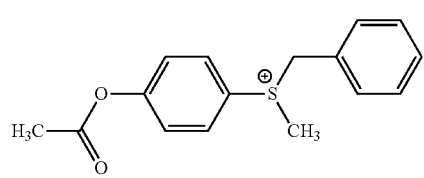

-continued

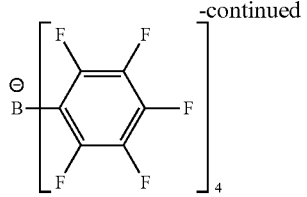

Example 53

An optical laminate was produced in the same manner as in Example 52, except that the amount of the thermal acid generator to be added was changed to 0.53 parts by mass. The optical laminate was used as an optical laminate of Example 53.

Example 54

An optical laminate was produced in the same manner as in Example 52, except that the amount of the thermal acid generator to be added was changed to 0.79 parts by mass. The optical laminate was used as an optical laminate of Example 54.

Example 55

An optical laminate was produced in the same manner as in Example 50, except that the polymer P-37 of the invention was used in the preparation of the photo-alignment film composition. The optical laminate was used as an optical laminate of Example 55.

Example 56

A photo-alignment film composition was produced in the same manner as in Example 52, except that the polymer P-42 of the invention was used and a photo-initiator represented by the following structural formula was used in place of the thermal acid generator in the preparation of the photo-alignment film composition.

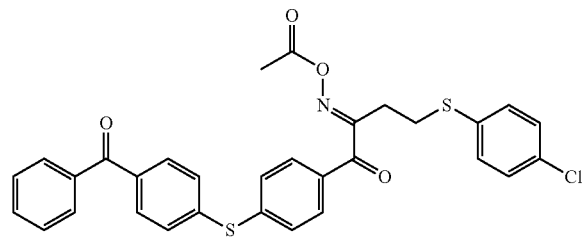 [SMILES: CC(=O)O/N=C(\CCSc1ccc(Cl)cc1)C(=O)c1ccc(Sc2ccc(C(=O)c3ccccc3)cc2)cc1]

[Production of Optical Laminate]

As a cellulose acylate film, the same one as Comparative Example 1 of JP2014-164169A was used.

A photo-alignment film composition prepared previously was coated on one surface of the film by a bar coater. After the coating, the solvent was removed by drying for 62 seconds on a hot plate at 123° C. and ultraviolet irradiation (300 mJ/cm$^2$, using an extra-high-pressure mercury lamp and a 365 nm bandpass filter) was performed to form a photo-isomerization composition layer having a thickness of 0.3 μm. The obtained photo-isomerization composition layer was irradiated with polarized ultraviolet light (7.9 mJ/cm$^2$, using an extra-high-pressure mercury lamp) to form a photo-alignment film.

Next, an optical laminate was produced in the same manner as in Example 50, except that the optically anisotropic layer coating liquid (liquid crystal 103) was used on the photo-alignment film. The optical laminate was used as an optical laminate of Example 56.

Example 57

An optical laminate was produced in the same manner as in Example 56, except that the polymer P-47 of the invention was used in the preparation of the photo-alignment film composition. The optical laminate was used as an optical laminate of Example 57.

[Solubility]

Each of the synthesized polymers was visually observed at room temperature for solubility in a mixed solvent of butyl acetate/methyl ethyl ketone (80/20) as a coating solvent, and evaluated according to the following criteria. The results are shown in the following Table 4.

A: 10 wt % or more of the polymer is dissolved.
B: 5 wt % to less than 10 wt % of the polymer is dissolved.
C: 1 wt % to less than 5 wt % of the polymer is dissolved.
D: Less than 1 wt % of the polymer is dissolved.

[Solvent Resistance]

Methyl ethyl ketone was coated on the produced photo-alignment film, and then a dichroic ratio of the photo-alignment film itself was evaluated according to the following criteria. The results are shown in the following Table 4. Comparative Example 1 in which the above-described solubility was ranked D is expressed by "-" in the following Table 4 since the evaluation for solvent resistance was not performed.

AA: The difference in dichroic ratio between before and after coating is 0% to less than 30%.
A: The difference in dichroic ratio between before and after coating is 30% to less than 40%.
B: The difference in dichroic ratio between before and after coating is 40% to less than 50%.
C: The difference in dichroic ratio between before and after coating is 50% to less than 60%.
D: The difference in dichroic ratio between before and after coating is 60% or greater.

[Liquid Crystal Aligning Properties (Fr)]

The produced optical laminates were observed using a polarizing microscope in a state of being deviated by 2 degrees from the extinction position. The results thereof were evaluated according to the following criteria. The results are shown in the following Table 4. Comparative Example 1 in which the above-described solubility was ranked D is expressed by "-" in the following Table 4 since the evaluation for solvent resistance was not performed.

AAA: The liquid crystal director is uniformly adjusted and aligned, and the plane state and display performance are extremely excellent.
AA: The liquid crystal director is uniformly adjusted and aligned, and the display performance is excellent.
A: There is no disorder of liquid crystal director, and the plane state is stable.
B: There is slight disorder of liquid crystal director, and the plane state is stable.
C: There is partial disorder of liquid crystal director, and the plane state is stable.
D: The liquid crystal director is significantly disordered, the plane state is unstable, and thus the display performance is very poor.

In this specification, the stable plane state means a state in which defects such as unevenness or alignment failures do not occur in a case where the optical laminate is installed and observed between two polarizing plates in crossed Nicol arrangement.

In this specification, the liquid crystal director means a vector in a direction (alignment main axis) in which the major axis of liquid crystalline molecules is aligned.

[Liquid Crystal Aligning Properties (Temporal)]

The produced photo-alignment film was left for 1.5 hours at 40° C. and a relative humidity of 60% before coating with a nematic liquid crystal compound. Then, an optical laminate was produced in the same manner as in the case of the optical laminate described above to observe the above-described aligning properties, and evaluation was performed according to the following criteria. The results are shown in the following Table 4. Comparative Example 1 in which the above-described solubility was ranked D and Comparative Example 2 in which the above-described liquid crystal aligning properties (Fr) were ranked D are expressed by "-" in the following Table 4 since the evaluation of solvent resistance was not performed.

AA: The liquid crystal director is uniformly adjusted and aligned, and the display performance is excellent.

A: There is no disorder of liquid crystal director, and the plane state is stable.

B: There is slight disorder of liquid crystal director, and the plane state is stable.

C: There is partial disorder of liquid crystal director, and the plane state is poor.

D: The liquid crystal director is significantly disordered, the plane state is unstable, and thus the display performance is very poor.

TABLE 4

| | | Repeating Unit | | Content * | | Weight- | | | Liquid Crystal Aligning Properties | |
| | | Repeating Unit A and the like | Repeating Unit B1 | Repeating Unit B2 | a/(a + b1 + b2) | b2/(a + b1 + b2) | Average Molecular Weight | Solubility | Solvent Resistance | Fr | Temporal |
| | Polymer | | | | | | | | | | |
|---|---|---|---|---|---|---|---|---|---|---|---|
| Example 1 | P-1 | A-2 | B-15 | — | 0.5 | 0 | 28000 | C | AA | C | C |
| Example 2 | P-2 | A-2 | B-1 | — | 0.5 | 0 | 28000 | C | AA | B | B |
| Example 3 | P-3 | A-2 | B-2 | — | 0.5 | 0 | 32000 | C | AA | A | A |
| Example 4 | P-4 | A-2 | B-3 | — | 0.5 | 0 | 32000 | C | AA | A | A |
| Example 6 | P-6 | A-7 | B-2 | — | 0.5 | 0 | 38000 | B | A | A | A |
| Example 8 | P-8 | A-7 | B-2 | — | 0.3 | 0 | 35000 | B | A | A | A |
| Example 10 | P-10 | A-8 | B-2 | — | 0.5 | 0 | 42000 | B | A | A | A |
| Example 13 | P-13 | A-16 | B-2 | — | 0.3 | 0 | 45000 | B | A | A | A |
| Example 14 | P-14 | A-16 | B-2 | — | 0.5 | 0 | 44000 | B | A | A | A |
| Example 16 | P-16 | A-19 | B-2 | — | 0.03 | 0 | 40000 | A | AA | B | B |
| Example 19 | P-19 | A-9 | B-2 | — | 0.3 | 0 | 50000 | A | A | A | A |
| Example 20 | P-20 | A-14 | B-2 | — | 0.3 | 0 | 49000 | A | A | A | A |
| Example 21 | P-21 | A-9 | B-2 | — | 0.2 | 0 | 48000 | A | AA | AA | AA |
| Example 22 | P-22 | A-14 | B-2 | — | 0.2 | 0 | 48000 | A | AA | AA | AA |
| Example 23 | P-23 | A-9 | B-2 | — | 0.15 | 0 | 40000 | AA | AA | AAA | AA |
| Example 24 | P-24 | A-9 | B-2 | — | 0.12 | 0 | 42000 | AA | AA | AAA | AA |
| Example 25 | P-25 | A-9 | B-2 | — | 0.09 | 0 | 44000 | AA | AA | AAA | AA |
| Example 26 | P-26 | A-9 | B-2 | — | 0.05 | 0 | 48000 | AA | AA | AA | AA |
| Example 27 | P-27 | A-9 | B-2 | — | 0.03 | 0 | 53000 | AA | AA | A | A |
| Example 28 | P-28 | A-14 | B-2 | — | 0.05 | 0 | 52000 | AA | AA | AA | AA |
| Example 29 | P-29 | A-20 | B-2 | — | 0.12 | 0 | 44000 | A | AA | AA | AA |
| Example 30 | P-30 | A-43 | B-2 | — | 0.12 | 0 | 45000 | AAA | A | AA | AA |
| Example 31 | P-31 | A-44 | B-2 | — | 0.12 | 0 | 48000 | AAA | A | AA | AA |
| Example 32 | P-32 | A-21 | B-2 | — | 0.12 | 0 | 43000 | A | AA | AA | AA |
| Example 33 | P-33 | A-9 | B-3 | — | 0.12 | 0 | 42000 | AA | AA | AAA | AA |
| Example 34 | P-34 | A-38 | B-2 | — | 0.15 | 0 | 82000 | AA | AA | AA | AA |
| Example 35 | P-35 | A-9 | B-2 | B-18 | 0.1 | 0.15 | 40000 | AA | AA | AA | AA |
| Example 36 | P-36 | A-9 | B-2 | B-19 | 0.1 | 0.15 | 41000 | AA | AA | A | A |
| Example 37 | P-37 | A-9 | B-2 | B-23 | 0.1 | 0.15 | 40000 | AA | AA | AA | AA |
| Example 38 | P-38 | A-9 | B-2 | B-23 | 0.1 | 0.06 | 40000 | AA | AA | A | B |
| Example 39 | P-39 | A-9 | B-2 | B-23 | 0.1 | 0.25 | 40000 | AA | AA | A | A |
| Example 40 | P-40 | A-9 | B-2 | B-23 | 0.1 | 0.4 | 40000 | AA | AA | A | A |
| Example 41 | P-41 | A-9 | B-2 | B-23 | 0.1 | 0.55 | 40000 | AA | AA | C | C |
| Example 48 | P-24 | A-9 | B-2 | — | 0.12 | 0 | 42000 | AA | AA | AAA | AA |
| Example 49 | P-24 | A-9 | B-2 | — | 0.12 | 0 | 42000 | AA | AA | AAA | AA |
| Example 50 | P-24 | A-9 | B-2 | — | 0.12 | 0 | 42000 | AA | AA | AAA | AA |
| Example 51 | P-39 | A-9 | B-2 | B-23 | 0.1 | 0.25 | 40000 | AA | AA | AA | AA |
| Example 52 | P-24 | A-9 | B-2 | — | 0.12 | 0 | 42000 | AA | AA | AAA | AA |
| Example 53 | P-24 | A-9 | B-2 | — | 0.12 | 0 | 42000 | AA | AA | AAA | AA |
| Example 54 | P-24 | A-9 | B-2 | — | 0.12 | 0 | 42000 | AA | AA | AAA | AA |
| Example 55 | P-37 | A-9 | B-2 | B-23 | 0.1 | 0.15 | 40000 | AA | AA | AA | AA |
| Example 56 | P-42 | A-9 | B-18 | — | 0.14 | 0 | 48000 | AA | AA | AAA | AA |
| Example 57 | P-47 | A-9 | B-18 | — | 0.22 | 0 | 54000 | AA | AA | AAA | AA |
| Comparative Example 1 | HP-1 | A-18 | — | — | 1 | 0 | 35000 | D | — | — | — |
| Comparative Example 2 | HP-2 | A-19 | — | — | 1 | 0 | 35000 | C | D | D | — |
| Comparative Example 3 | HP-3 | H-2 | B-1 | — | 0.5 | 0 | 35000 | B | B | C | D |
| Comparative Example 4 | HP-4 | H-1 | B-1 | — | 0.5 | 0 | 30000 | B | C | C | D |

* A content of the repeating unit shown in the column of "Repeating Unit A and the like" is represented by a, a content of the repeating unit shown in the column of "Repeating Unit B1" is represented by b1, and a content of the repeating unit shown in the column of "Repeating Unit B2" is represented by b2.

From the results shown in Table 4, it has been found that in a case where the repeating unit B including a crosslinkable group represented by Formula (B) is not contained, the solubility is poor, and even with no problem in solubility, the photo-alignment film has poor solvent resistance and liquid crystal aligning properties (Comparative Examples 1 and 2).

It has also been found that in a case where the repeating unit including a cinnamate group does not include a divalent linking group including a nitrogen atom and a cycloalkane ring, the photo-alignment film has poor liquid crystal aligning properties (temporal) even in a case where the repeating unit B including a crosslinkable group represented by Formula (B) is contained (Comparative Examples 3 and 4).

In contrast, it has been found that in a case where a photo-alignment copolymer having the repeating unit A including a photo-alignment group represented by Formula (A) and the repeating unit B including a crosslinkable group represented by Formula (B) is used, the photo-alignment film has improved solvent resistance and has excellent liquid crystal aligning properties regardless of the timing at which an optically anisotropic layer is formed (Examples 1 to 4, 6, 8, 10, 13, 14, 16, 19 to 41, and 48 to 57).

In particular, from the comparison between the examples, it has been found that in a case where $R^4$ in Formula (A) is an alkoxy group having 6 to 16 carbon atoms, the liquid crystal aligning properties are improved.

From the comparison between the examples, it has also been found that in a case where $L^1$ in Formula (A) is a divalent linking group represented by any one of Formula (2), Formula (3), or Formula (4), the balance between the solubility in a solvent to be used during the formation of a photo-alignment film and the solvent resistance of a photo-alignment film to be obtained is improved.

Example 58

[Preparation of Coating Liquid]

An optical laminate was produced in the same manner as in Example 24, except that the following optically anisotropic layer coating liquid (liquid crystal 105) was used in place of the nematic liquid crystal compound coated on the alignment film to fix the alignment of the liquid crystal compound by the following producing method. The optical laminate was used as an optical laminate of Example 58.

| Optically Anisotropic Layer Coating Liquid (liquid crystal 105) | |
| --- | --- |
| Following Liquid Crystal Compound L-8 | 39.00 parts by mass |
| Following Liquid Crystal Compound L-9 | 39.00 parts by mass |
| Following Liquid Crystal Compound L-10 | 17.00 parts by mass |
| Above-Described Polymerizable Compound A-1 | 5.00 parts by mass |
| Above-Described Polymerization Initiator S-1 (oxime type) | 0.50 parts by mass |
| Leveling Agent (compound G-1 described above) | 0.20 parts by mass |
| Cyclopentanone | 235.00 parts by mass |

Liquid Crystal Compound L-8

Liquid Crystal Compound L-9

Liquid Crystal Compound L-10

[Producing Method]

The optically anisotropic layer coating liquid (liquid crystal 105) was coated on the photo-alignment surface using a bar coater. The coating film formed on the alignment film was heated to 120° C. by warm air, and then cooled to 60° C. Then, 100 mJ/cm² of ultraviolet light was applied to the coating film at a wavelength of 365 nm using a high-pressure mercury lamp under a nitrogen atmosphere. The coating film was then irradiated with 500 mJ/cm² of ultraviolet light while being heated to 120° C. to fix the alignment of the liquid crystal compound, and an optical laminate of Example 58 was produced.

Example 59

An optical laminate was produced in the same manner as in Example 24, except that the following optically anisotropic layer coating liquid (liquid crystal 106) was used in place of the nematic liquid crystal compound coated on the alignment film to fix the alignment of the liquid crystal compound by the following producing method. The optical laminate was used as an optical laminate of Example 59.

| Optically Anisotropic Layer Coating Liquid (liquid crystal 106) | |
|---|---|
| Above-Described Liquid Crystal Compound L-3 | 40.00 parts by mass |
| Above-Described Liquid Crystal Compound L-4 | 40.00 parts by mass |
| Above-Described Polymerizable Compound A-1 | 20.00 parts by mass |

| Optically Anisotropic Layer Coating Liquid (liquid crystal 107) | |
|---|---|
| Above-Described Liquid Crystal Compound L-3 | 42.00 parts by mass |
| Above-Described Liquid Crystal Compound L-4 | 42.00 parts by mass |
| Above-Described Polymerizable Compound A-1 | 8.00 parts by mass |
| Following Polymerizable Compound A-2 | 8.00 parts by mass |
| Above-Described Polymerization Initiator S-1 (oxime type) | 0.50 parts by mass |
| Leveling Agent (compound G-1 described above) | 0.20 parts by mass |
| HISOLVE MTEM (manufactured by TOHO Chemical Industry Co., Ltd.) | 2.00 parts by mass |
| NK Ester A-200 (manufactured by SHIN-NAKAMURA CHEMICAL CO, LTD.) | 1.00 part by mass |
| Methyl Ethyl Ketone | 424.8 parts by mass |

A-2

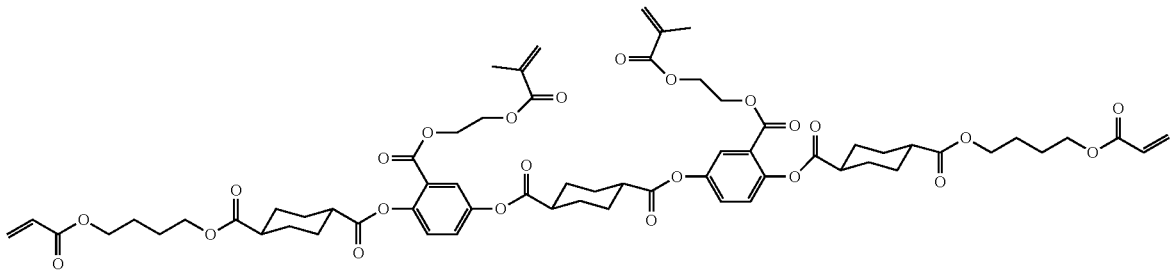

-continued

| Optically Anisotropic Layer Coating Liquid (liquid crystal 106) | |
|---|---|
| Above-Described Polymerization Initiator S-1 | 0.60 parts by mass |
| Following Polymerizable Compound B-1 | 7.00 parts by mass |
| Leveling Agent (compound G-1 described above) | 0.10 parts by mass |
| Methyl Ethyl Ketone | 200.00 parts by mass |
| Cyclopentanone | 200.00 parts by mass |

B-1

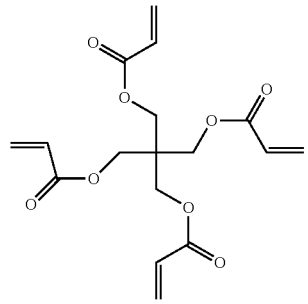 [SMILES: C=CC(=O)OCC(COC(=O)C=C)(COC(=O)C=C)COC(=O)C=C]

[Producing Method]

The optically anisotropic layer coating liquid (liquid crystal 106) was coated on the photo-alignment surface using a bar coater. The coating film obtained as above was aged by heating at a film surface temperature of 100° C. for 20 seconds, and cooled to 90° C. Then, 300 mJ/cm² of ultraviolet light was applied to the coating film using an air-cooled metal halide lamp (manufactured by EYE GRAPHICS CO., LTD.) in the air to fix the nematic alignment state, and thus an optical laminate of Example 59 was formed.

Example 60

An optical laminate was produced in the same manner as in Example 24, except that the following optically anisotropic layer coating liquid (liquid crystal 107) was used in place of the nematic liquid crystal compound coated on the alignment film to fix the alignment of the liquid crystal compound by the following producing method. The optical laminate was used as an optical laminate of Example 60.

[Producing Method]

The optically anisotropic layer coating liquid (liquid crystal 107) was coated on the photo-alignment surface using a bar coater. The coating film formed on the alignment film was heated to 120° C. by warm air, and then cooled to 60° C. Then, 10 mJ/cm² of ultraviolet light was applied to the coating film at a wavelength of 365 nm using a high-pressure mercury lamp under a nitrogen atmosphere. The coating film was then irradiated with 500 mJ/cm² of ultraviolet light while being heated to 120° C. to fix the alignment of the liquid crystal compound, and an optical laminate of Example 60 was produced.

Examples 61 and 62

Samples prepared in the same manner as in Example 24, except that a cellulose acylate film 1 or 2 was used in place of the cellulose acylate film described in Comparative Example 1 of JP2014-164169A in Example 24, were used as Examples 61 and 62, respectively.

[Production of Cellulose Acylate Film 1]

(Preparation of Core Layer Cellulose Acylate Dope)

The following composition was put into a mixing tank and stirred to dissolve the components, and a cellulose acetate solution to be used as a core layer cellulose acylate dope was prepared.

| Core Layer Cellulose Acylate Dope | |
|---|---|
| Cellulose Acetate Having Acetyl Substitution Degree of 2.88 | 100 parts by mass |

| Core Layer Cellulose Acylate Dope | |
|---|---|
| Polyester Compound B Described in Example of JP2015-227955A | 12 parts by mass |
| Following Compound G | 2 parts by mass |
| Methylene Chloride | 430 parts by mass |
| Methanol | 64 parts by mass |

Compound G

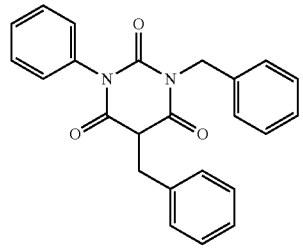 [SMILES: O=C1C(Cc2ccccc2)C(=O)N(c2ccccc2)C(=O)N1Cc1ccccc1]

(Preparation of Outer Layer Cellulose Acylate Dope)

To 90 parts by mass of the core layer cellulose acylate dope, 10 parts by mass of the following matting agent solution was added to prepare a cellulose acetate solution to be used as an outer layer cellulose acylate dope.

| Matting Agent Solution | |
|---|---|
| Silica Particles Having Average Particle Size of 20 nm (AEROSIL R972, manufactured by NIPPON AEROSIL CO., LTD.) | 2 parts by mass |
| Methylene Chloride | 76 parts by mass |
| Methanol | 11 parts by mass |
| Above-Described Core Layer Cellulose Acylate Dope | 1 part by mass |

(Casting of Cellulose Acylate Film 1)

The core layer cellulose acylate dope and the outer layer cellulose acylate dope were filtered through filter paper having an average pore size of 34 μm and a sintered metal filter having an average pore size of 10 μm. Then, three layers of the core layer cellulose acylate dope and the outer layer cellulose acylate dopes on both sides of the core layer cellulose acylate dope were simultaneously cast from a casting port onto a drum at 20° C. (band casting machine). The film was peeled off at a solvent content of about 20 mass %, and both ends of the film in a width direction were fixed by tenter clips. The film was dried while being stretched in a transverse direction at a stretching ratio of 1.1 times. Thereafter, the film was further dried by being transported between the rolls of the heat treatment device to produce an optical film having a thickness of 40 μm, which was used as an optical film of Example 1. The core layer of the optical film of Example 1 had a thickness of 36 μm, and the outer layers disposed on both sides of the core layer had a thickness of 2 μm. The in-plane retardation of the obtained cellulose acylate film 1 was 0 nm.

[Production of Cellulose Acylate Film 2]

As a cellulose acylate film, the same one as Example 6 of JP2012-215689A was used.

In the liquid crystal aligning properties (Fr, temporal) as an evaluation item in Table 4, Examples 58 to 62 were ranked AAA and AA, respectively, as in Example 24, and these were good results.

What is claimed is:

1. A photo-alignment copolymer comprising:

a repeating unit A including a photo-alignment group represented by Formula (A); and a repeating unit B including a crosslinkable group represented by Formula (B),

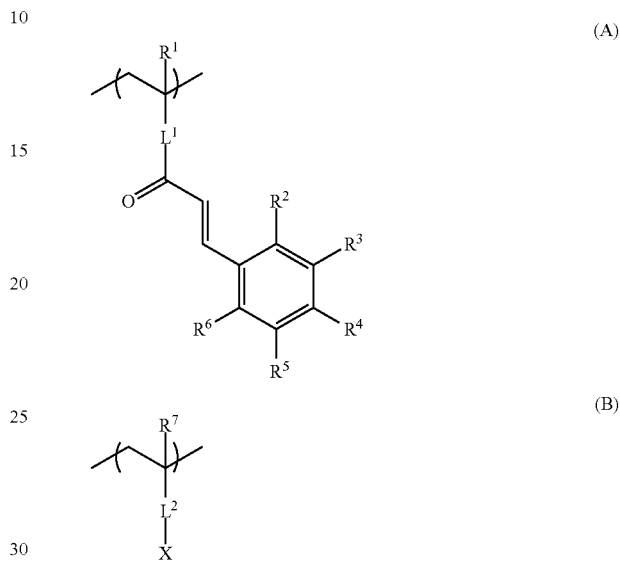

in Formula (A), $R^1$ represents a hydrogen atom or a methyl group, $L^1$ is a divalent linking group represented by any one of Formulae (1) to (10),

(3)
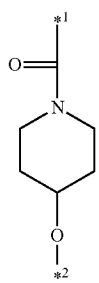

(4)
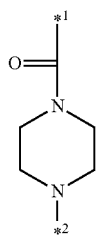

(5)
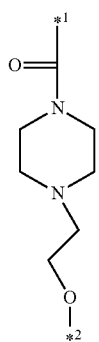

(6)
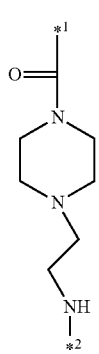

(7)
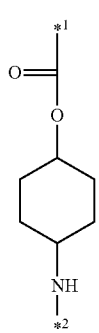

(8)
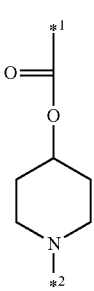

(9)
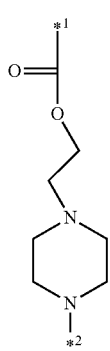

(10)
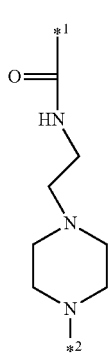

in Formulae (1) to (10), *1 represents the bonding position with the carbon atom constituting the main chain in Formula (A), and *2 represents the bonding position with the carbon atom constituting the carbonyl group in Formula (A), $R^2$, $R^3$, $R^4$, $R^5$, and $R^6$ each independently represent a hydrogen atom or a substituent, and among $R^2$, $R^3$, $R^4$, $R^5$, and $R^6$, two adjacent groups may be bonded to form a ring, and in Formula (B), $R^7$ represents a hydrogen atom or a methyl group, $L^2$ represents a divalent linking group, and X represents a crosslinkable group, wherein X in Formula (B) is at least one crosslinkable group selected from the group consisting of Formulae (X1) to (X4), (X1)

-continued

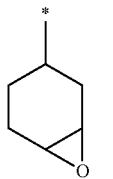
(X2)

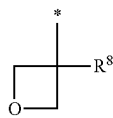
(X3)

(X4)

in Formulae (X1) to (X4), * represents the bonding position with $L^2$ in Formula (B), $R^8$ represents any one of a hydrogen atom, a methyl group, or an ethyl group, and S in Formula (X4) represents any one of a vinyl group, an allyl group, a styryl group, an acryloyl group, and a methacryloyl group, and wherein the photo-alignment copolymer has a weight-average molecular weight of 10.000 to 500 000.

2. The photo-alignment copolymer according to claim 1, wherein the repeating unit B includes a repeating unit in which X in Formula (B) is a crosslinkable group represented by any one of Formula (X1), Formula (X2), or Formula (X3) and a repeating unit in which X in Formula (B) is a crosslinkable group represented by Formula (X4).

3. The photo-alignment copolymer according to claim 1, wherein $L^2$ in Formula (B) is a divalent linking group formed by combining at least two selected from the group consisting of a linear, branched, or cyclic alkylene group having 1 to 18 carbon atoms and optionally having a substituent, an arylene group having 6 to 12 carbon atoms and optionally having a substituent, an ether group, a carbonyl group, and an imino group optionally having a substituent.

4. The photo-alignment copolymer according to claim 1, wherein $L^1$ in Formula (A) is a divalent linking group represented by any one of Formula (2), Formula (3), Formula (7), or Formula (8).

5. The photo-alignment copolymer according to claim 1, wherein at least $R^4$ among $R^2$, $R^3$, $R^4$, $R^5$ and $R^6$ in Formula (A) represents a substituent.

6. The photo-alignment copolymer according to claim 5, wherein $R^2$, $R^3$, $R^5$, and $R^6$ in Formula (A) all represent a hydrogen atom.

7. The photo-alignment copolymer according to claim 5, wherein $R^4$ in Formula (A) is an electron-donating substituent.

8. The photo-alignment copolymer according to claim 7, wherein the electron-donating substituent is an alkoxy group having 6 to 16 carbon atoms.

9. The photo-alignment copolymer according to claim 1, wherein the substituents represented by $R^2$, $R^3$, $R^4$, $R^5$, and $R^6$ in Formula (A) each independently represent a halogen atom, a linear, branched, or cyclic alkyl group having 1 to 20 carbon atoms, a linear halogenated alkyl group having 1 to 20 carbon atoms, an alkoxy group having 1 to 20 carbon atoms, an aryl group having 6 to 20 carbon atoms, an aryloxy group having 6 to 20 carbon atoms, a cyano group, an amino group, or a group represented by Formula (11),

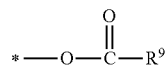
(11)

in Formula (11), * represents a bonding position with a benzene ring in Formula (A), and $R^9$ represents a monovalent organic group.

10. The photo-alignment copolymer according to claim 1, wherein a content a of the repeating unit A and a content b of the repeating unit B satisfy Formula (12) by mass ratio, $$0.03 \leq a/(a+b) \leq 0.5 \ldots \quad (12).$$

11. The photo-alignment copolymer according to claim 10, wherein the content a of the repeating unit A and the content b of the repeating unit B satisfy Formula (13) by mass ratio, $$0.03 \leq a/(a+b) \leq 0.3 \ldots \quad (13).$$

12. The photo-alignment copolymer according to claim 10, wherein the content a of the repeating unit A and the content b of the repeating unit B satisfy Formula (14) by mass ratio, $$0.03 \leq a/(a+b) 0.2 \ldots \quad (14).$$

13. The photo-alignment copolymer according to claim 1, wherein the weight-average molecular weight of the photo-alignment copolymer is 30,000 to 300,000.

14. A photo-alignment film which is formed from a photo-alignment film composition containing the photo-alignment copolymer according to claim 1.

15. An optical laminate comprising:
the photo-alignment film according to claim 14; and
an optically anisotropic layer which is formed from a liquid crystal composition containing a liquid crystal compound.

* * * * *